(12) United States Patent
Nguyen et al.

(10) Patent No.: US 11,539,844 B2
(45) Date of Patent: Dec. 27, 2022

(54) AUDIO CONFERENCING USING A DISTRIBUTED ARRAY OF SMARTPHONES

(71) Applicant: DOLBY LABORATORIES LICENSING CORPORATION, San Francisco, CA (US)

(72) Inventors: Khoa-Van Nguyen, Begles (FR); Stephane Giraudie, Sausalito, CA (US); Benoit Senard, Le Bouscat (FR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/574,792

(22) Filed: Sep. 18, 2019

(65) Prior Publication Data

US 2020/0099792 A1 Mar. 26, 2020

Related U.S. Application Data

(60) Provisional application No. 62/734,856, filed on Sep. 21, 2018.

(51) Int. Cl.
*H04M 3/42* (2006.01)
*H04R 5/00* (2006.01)
*H04M 3/56* (2006.01)
*H04M 1/60* (2006.01)
*H04W 4/08* (2009.01)
*H04W 4/16* (2009.01)

(52) U.S. Cl.
CPC ......... *H04M 3/568* (2013.01); *H04M 1/6058* (2013.01); *H04W 4/08* (2013.01); *H04W 4/16* (2013.01)

(58) Field of Classification Search
CPC ..... H04M 3/568; H04M 1/6058; H04W 4/16; H04W 4/08
USPC ........................................................ 455/416
See application file for complete search history.

(56) References Cited

U.S. PATENT DOCUMENTS

| | | | | |
|---|---|---|---|---|
| 8,606,249 | B1 * | 12/2013 | Goodwin | H04L 12/1827 455/416 |
| 2009/0264114 | A1 * | 10/2009 | Virolainen | H04M 3/56 455/416 |
| 2010/0074433 | A1 * | 3/2010 | Zhang | H04M 9/082 379/406.08 |
| 2012/0230509 | A1 * | 9/2012 | Hagglund | H04R 1/1041 381/74 |

(Continued)

FOREIGN PATENT DOCUMENTS

CN 107294742 B 10/2017

*Primary Examiner* — Mark G. Pannell

(57) ABSTRACT

Described is a method of hosting a teleconference among a plurality of client devices arranged in two or more acoustic spaces, each client device having an audio capturing capability and/or an audio rendering capability, the method comprising: grouping the plurality of client devices into two or more groups based on their belonging to respective acoustic spaces, receiving first audio streams from the plurality of client devices, generating second audio streams from the first audio streams for rendering by respective client devices among the plurality of client devices, based on the grouping of the plurality of client devices into the two or more groups, and outputting the generated second audio streams to respective client devices. Further described are corresponding computation devise, computer programs, and computer-readable storage media.

14 Claims, 14 Drawing Sheets

(56) References Cited

U.S. PATENT DOCUMENTS

| | | | | |
|---|---|---|---|---|
| 2012/0260232 | A1* | 10/2012 | Hirsch | G06F 8/20 |
| | | | | 717/107 |
| 2014/0112505 | A1* | 4/2014 | Osada | H04R 5/02 |
| | | | | 381/303 |
| 2015/0139044 | A1* | 5/2015 | Maski | H04W 4/08 |
| | | | | 370/261 |
| 2015/0244869 | A1* | 8/2015 | Cartwright | H04M 3/568 |
| | | | | 370/260 |
| 2015/0271341 | A1 | 9/2015 | Kleiner | |
| 2016/0014373 | A1* | 1/2016 | LaFata | H04N 7/152 |
| | | | | 348/14.08 |
| 2016/0050491 | A1* | 2/2016 | Ahgren | H04L 65/403 |
| | | | | 381/66 |
| 2016/0142462 | A1 | 5/2016 | Johnston | |
| 2016/0150184 | A1* | 5/2016 | Gandhi | H04N 7/147 |
| | | | | 348/14.08 |
| 2016/0344780 | A1* | 11/2016 | Kay | H04M 3/568 |
| 2017/0127145 | A1 | 5/2017 | Rajapakse | |
| 2019/0261126 | A1* | 8/2019 | Lyren | H04M 1/7243 |

* cited by examiner

| REPRESENTATIVE AUDIO STREAM ASSIGNMENTS | OUTPUT A. STREAM TO CI. DEVICE 210E | OUTPUT A. STREAM TO CI. DEVICE 210F | OUTPUT A. STREAM TO CI. DEVICE 210G | OUTPUT A. STREAM TO CI. DEVICE 210H |
|---|---|---|---|---|
| INPUT A. STREAM FROM CI. DEVICE 210A | | | X | |
| INPUT A. STREAM FROM CI. DEVICE 210B | | X | | |
| INPUT A. STREAM FROM CI. DEVICE 210C | X | | | |
| INPUT A. STREAM FROM CI. DEVICE 210D | | | | X |

FIG. 8

AUDIO CONFERENCING USING A DISTRIBUTED ARRAY OF SMARTPHONES

CROSS-REFERENCE TO RELATED APPLICATIONS

This application claims priority to U.S. Provisional Patent Application No. 62/734,856, filed Sep. 21, 2018, which is hereby incorporated by reference in its entirety.

TECHNICAL FIELD

The disclosure relates to the field of audio processing. In particular, the disclosure relates to techniques for hosting teleconferences among a plurality of client devices.

BACKGROUND

There are currently many problems with web-conferencing applications in which several of the participants are located in the same room. In particular, the sound quality, spatial rendering, and recording/capturing of participants in traditional web-conferencing applications is lackluster. Often, participants have to mute client devices, move client devices, and/or rely on non-spatially rendered audio in web-conferencing. Accordingly, a method of improving the sound quality and spatial rendering leveraging an array of client devices would be beneficial.

SUMMARY

In view of the above, the present disclosure provides a method of hosting a teleconference, a computation device for hosting a teleconference, a program, and a computer-readable storage medium, having the features of the respective independent claims.

According to an aspect of the disclosure, a method of hosting a teleconference among a plurality of client devices arranged in two or more acoustic spaces is provided. In the context of this disclosure, an acoustic space is understood to indicate an acoustic environment or listening environment. The acoustic space may correspond to a physical room. However, it is also possible that a physical room (especially a large physical room) includes more than one acoustic space. In some implementations, an acoustic space may be understood to relate to such spatial area that talkers located in the spatial area can understand each other. The method may be performed by a host of the teleconference. The host may be a network-based or cloud-based host (e.g., server), or one of the client devices, for example. The client devices may be mobile phones, such as smartphones, for example. Each client device may have an audio capturing capability and/or an audio rendering capability. Preferably, the client devices have both the audio capturing capability and the audio rendering capability. The method may include grouping the plurality of client devices into two or more groups based on their belonging to respective acoustic spaces. For each acoustic space, there may be a respective corresponding group of client devices. Thus, client devices in a group corresponding to an acoustic space may be those client devices that are present in the acoustic space. The method may further include receiving first audio streams from the plurality of client devices. The first audio streams may be referred to as captured audio streams or incoming audio streams (as seen from the host). There may be one first audio stream for each client device among the plurality of client devices. The method may further include generating second audio streams from the first audio streams for rendering by respective client devices among the plurality of client devices, based on the grouping of the plurality of client devices into the two or more groups. The second audio streams may be referred to as processed audio streams or outgoing audio streams (as seen from the host). There may be one second audio stream for each client device among the plurality of client devices. The method may yet further include outputting (e.g., transmitting) the generated second audio streams to respective client devices.

Configured as described above, the proposed method allows to leverage the presence of multiple client devices in the same acoustic space (e.g., room) for improving the capturing (recording) of audio by signal processing techniques. Further, the method allows to employ spatialization techniques and other techniques for improving the perceived sound quality, again leveraging the presence of multiple client devices in the same acoustic space.

In some embodiments, generating the second audio streams may include, for an active sound source in a given acoustic space, determining the client device in the given acoustic space that is closest (nearest) to the active sound source. Generating the second audio streams may further include generating a source audio stream that represents captured audio for the currently active sound source, based on the first audio stream from the determined client device, disregarding the first audio streams from any other client devices in the same group as the determined client device. Disregarding a first audio stream may be implemented by muting the first audio stream, for example. Needless to say, first audio streams from client devices in groups other than the group of the determined client device may be disregarded as well. Generating the second audio streams may yet further include generating the second audio streams from the source audio stream (e.g., instead of from the first audio streams).

In some embodiments, determining the client device in the given acoustic space that is closest to the active sound source may be based on at least one of: measuring sound volumes of audio events (e.g., audio events relating to the active sound source) in first audio streams from client devices in a group corresponding to the given audio space, and measuring times of arrival of audio events in first audio streams from client devices in a group corresponding to the given audio space. When doing so, it may be assumed that the client device whose first audio stream features the loudest sound volume is closest to the active sound source. Likewise, it may be assumed that the client device whose first audio stream features the earliest time of arrival is closest to the active sound source. Considering sound volumes may require or imply that there is a pre-calibration step in which the client devices' input and/or output volumes are aligned. Considering times of arrival of audio events may require or imply that the relevant first audio streams are time-synchronized.

In some embodiments, generating the second audio streams may include, for an active sound source in a given acoustic space, applying a signal processing technique to the first audio streams from client devices that are grouped in a group corresponding to the given acoustic space, to generate a source audio stream that represents captured audio for the currently active sound source. The signal processing technique may be a technique for noise reduction or source separation, for example. In some implementations, the signal processing technique may relate to a beamforming technique. Generating the second audio streams may further include generating the second audio streams from the source audio stream (e.g., instead of from the first audio streams).

In some embodiments, for a given group of client devices, first audio streams from client devices in the given group of client devices may not be used for generating second audio streams for the client devices in the given group of client devices. In general, a first audio stream from a client device in a given group of client devices may not be used for generating second audio streams for any client devices in the same group of client devices. Put differently, a first audio stream from a client device in a given group of client devices may only be used for generating second audio streams for client devices in groups of client devices other than the given group of client devices. Thereby, captured audio from a client device is not rendered by the other client devices in the same group. This ensures that sound that is directly perceived by the users of the client devices is not additionally replayed by the client devices, which helps to avoid disturbing or annoying redundancy, as well as acoustic looping that might lead to the "Larsen effect".

In some embodiments, the second audio streams may be generated to be the same for all client devices in a given group of client devices. Thus, all client devices in a given group (e.g., in a given room) may render the same sound. This allows to increase the overall rendering volume (or loudness) without having to increase the individual client devices' output volume.

In some embodiments, the method may further include determining a linear mapping function (e.g., multi-linear mapping function) for mapping the first audio streams to the second audio streams based on the grouping of the plurality of client devices into the two or more groups. The method may yet further include generating the second audio streams from the first audio streams by applying the linear mapping function to the first audio streams. The linear mapping function may be fixed as long as the composition of the members of the teleconference does not change. It may be determined anew whenever a client device joins or leaves the teleconference. Further, the first and second audio streams may be arranged as the entries of respective vectors. Then, the mapping function can be implemented as a matrix that acts on the vector of the first audio streams. In some implementations, there may be a one-to-one relationship between client devices in their function as generators of first audio streams and client devices in their function as recipients of second audio streams. For instance, each first audio stream from client devices in a first group of client devices may be (exclusively) used to generate a respective second audio stream for a respective client device in a second group of client devices.

In some embodiments, the method may further include, for at least one group of client devices, assigning client devices in other groups of client devices to respective virtual source locations in a virtual listening environment. Therein, the second audio streams for the client devices in the at least one group of client devices may be generated such that captured audio from the client devices in the other groups of client devices is rendered to respective virtual source locations when the second audio streams for the client devices in the at least one group of client devices are rendered by the client devices in the at least one group of client devices. This may involve panning the first audio streams (or source audio streams generated therefrom) to the second audio streams in the at least one group of client devices. The panning may be based on a relative spatial arrangement of the client devices in the at least one group of client devices.

In some embodiments, the method may further include, for each client device among the plurality of client devices, detecting whether the respective client device renders audio via headphone loudspeakers. The method may yet further include, for each client device that is determined to render audio via headphone loudspeakers, generating the second audio stream for the respective client device to include captured audio from all active sound sources. This may involve assigning sound sources to virtual source locations and binaural filtering of the first audio streams (or source audio streams generated therefrom). Thereby, it is ensured that participants in the teleconference that use headphone loudspeakers with their client devices can listen to any talker in the teleconference, regardless of audio improvement techniques that might be applied to the sound rendered by the other client devices in the same group.

In some embodiments, the method may further include performing single-channel echo cancellation for at least one client device among the plurality of client devices to suppress a representation of the second audio stream received by the at least one client device in the first audio stream output by the at least one client device. Additionally or alternatively, the method may further include performing multi-channel echo cancellation for at least one group of client devices to suppress representations of the second audio streams received by the client devices in the at least one group of client devices in the first audio streams output by the client devices in the at least one group of client devices.

In some embodiments, grouping the plurality of client devices based on their belonging to respective acoustic spaces may involve at least one of acoustic watermarking, receiving a user input indicative of a list of client devices present in at least one acoustic space, proximity detection using Bluetooth communication between client devices, and visual inspection using one or more video cameras. Acoustic watermarking may involve playing a predetermined audio signal (e.g., a jingle) by a client device that participates in the teleconference and checking for the presence of a representation of the predetermined audio signal in captured (i.e., first) audio streams of other client devices participating in the teleconference. The client device playing the predetermined audio signal may be an audio device that newly joins the teleconference. Checking for the presence of the representation of the predetermined audio signal may involve pattern detection, such as determining correlation functions of the predetermined audio signal and respective captured (i.e., first) audio streams, for example. The one or more video cameras may comprise respective video cameras provided with one or more of the client devices, or one or more additional video cameras looking into a room in which at least some of the client devices are located.

In some embodiments, the method may further include, for at least one group of client devices, determining a relative spatial arrangement of the client devices in the respective group of client devices. Then, generating the second audio streams may be further based on the determined relative spatial arrangement of client devices in the at least one group of client devices. The relative spatial arrangement for a given group may be determined by at least one of measuring sound volumes of audio events in first audio streams from client devices in the given group, measuring times of arrival of audio events in first audio streams from client devices in the given group, receiving user input (e.g., via a GUI), and/or visual inspection by one or more video cameras.

In some embodiments, the method may further include, for at least one group of client devices, determining a transmission latency between each of the client devices in the at least one group of client devices and a device hosting the teleconference (i.e., host). Then, the method may yet further include adding respective delays to the second audio streams for the client devices in the at least one group of client devices based on the determined transmission latencies, to time-synchronize the second audio streams for the client devices in the at least one group of client devices.

In some embodiments, the grouping the plurality of client devices into two or more groups may be further based on at least one of: operating systems of the client devices and CPU availabilities of the client devices. For example, the client devices may be first grouped based on their belonging to respective acoustic spaces and may be further grouped into (sub-)groups based on the aforementioned grouping criteria.

According to another aspect, a computation device is provided. The computation device may include a processor configured to perform any of the methods described throughout the disclosure.

According to another aspect, a computer program is provided. The computer program may include instruction that, when executed by a computation device, cause the computation device to perform any of the methods described throughout the disclosure.

According to yet another aspect, a computer-readable storage medium is provided. The computer-readable storage medium may store the aforementioned computer program.

BRIEF DESCRIPTION OF DRAWINGS

FIG. 8 is an illustration of a matrix scheme displayed on a client device for assigning inputs and outputs for a conferencing session.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Example Listening Environments

Figure 1A:
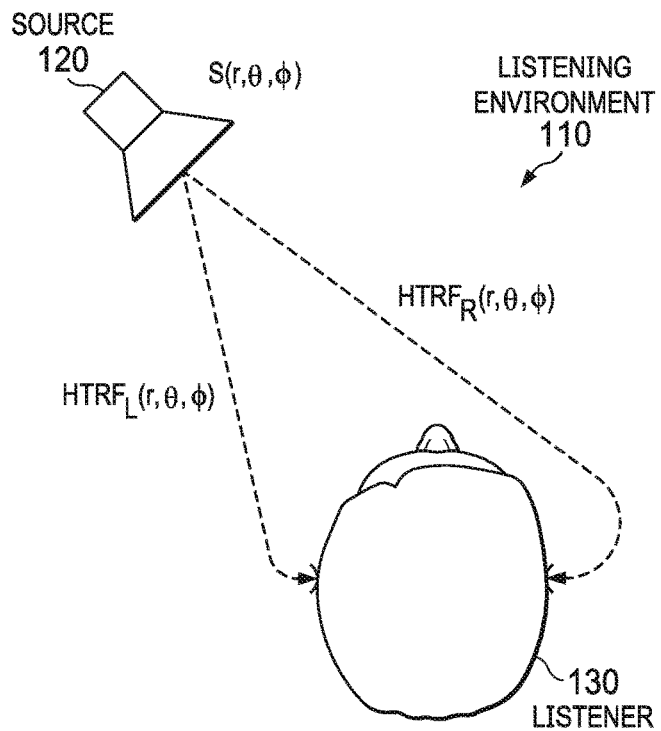
FIG. 1A is an illustration of a listening environment including a source at a source location and a listener at a listener location.

FIG. 1A shows an example a real-world listening environment 110. In this example, a sound source or source (S) 120 generates a sound (or sound field) and a listener 130 perceives the generated sound. The sound generated by the sound source 120 may relate to an audio stream (source audio stream) for the sound source 120 that is representative of the sound generated by the sound source 120. The sound (or sound field) at the location of the listener 130 is a function of the orientation (relative position) between the source 120 and the listener 130. That is, the way the listener 130 perceives the sound is a function of the distance r, azimuth θ, and inclination φ of the audio source 120 relative to the listener 130. More specifically, the listener 130 perceives the sound differently for their left ear and their right ear. For example, if a source 120 generates a sound on the left side of the head of a listener 130, the left ear of the listener 130 will perceive a different sound than their right ear. This allows the listener 130 to perceive the source 120 at the source location.

Accordingly, a source 120 generating a sound can be modeled as two different sound components: one for the left ear and one for the right ear. In one example, the two different sound components are the original sound filtered by a head-related transfer function (HRTF) for the left ear and a HRTF for the right ear of the listener 130, respectively. In terms of audio streams, audio streams for the left and right ears would be HRTF-filtered versions of an original audio stream for the sound source. A HRTF is a response that characterizes how an ear receives a sound from a point in space and, more specifically, models the acoustic path from the source 120 at a specific location to the ears of a listener 130. Accordingly, a pair of HRTFs for two ears can be used to synthesize an audio stream that is perceived to originate from the particular location in space of the source 120. In another example, the sound (or original source audio stream) is filtered by some other audio filter such that the listener 130 can perceive the location of the source 120 when listening to the audio stream on an audio playback device.

Figure 1B:
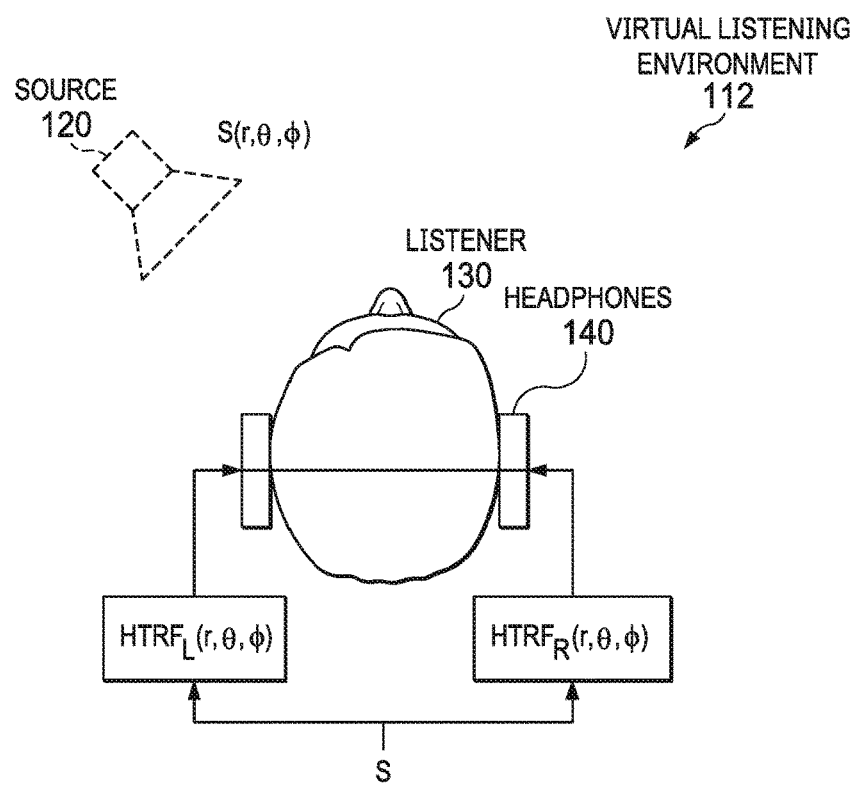
FIG. 1B is an illustration of a listening environment virtually reproducing a source at a source location for a listener at a listener location.

FIG. 1B shows an example of a virtual listening environment 112. In this example, the virtual listening environment 112 is recreating the sound generated by a source 120 for a listener 130 wearing a pair of headphones 140. In an example where the virtual listening environment does not include HRTFs to generate an audio stream from the source audio stream, the user cannot perceive a location of the source 120. That is, the user perceives the source as originating between their ears. However, as illustrated, the virtual listening environment 112 includes an audio filter that generates an audio stream using HRTFs. The generated audio stream allows the listener 130 to perceive the audio stream as if it originated from the source at the source location.

Figure 1C:
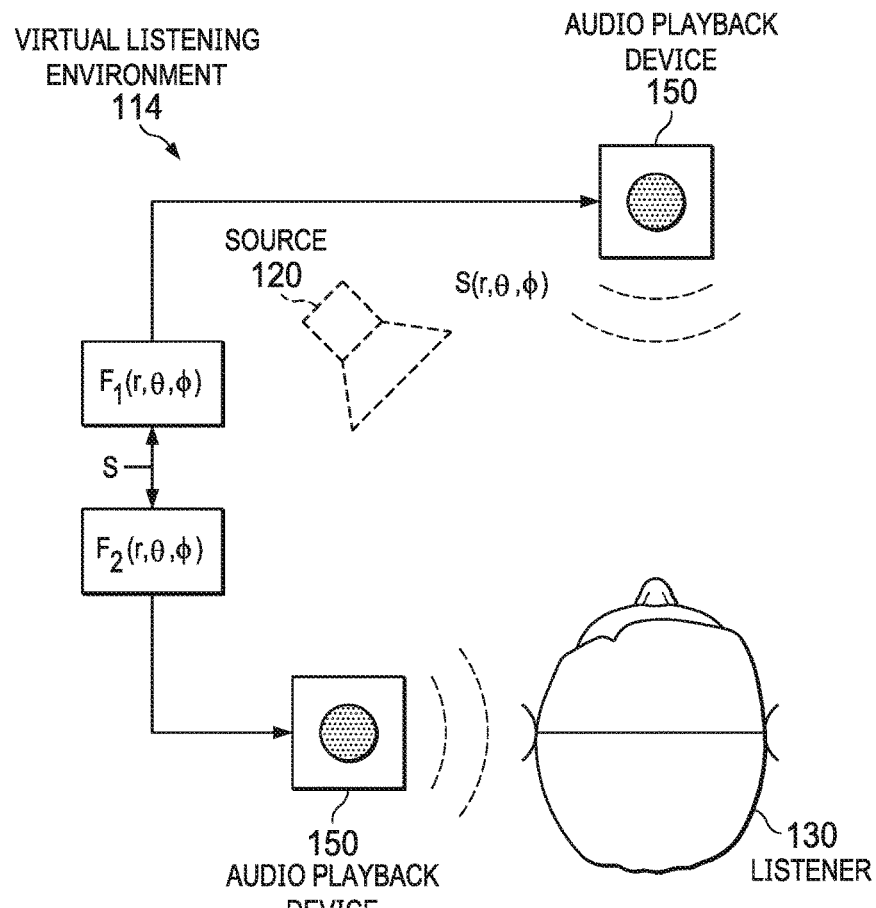
FIG. 1C is an illustration of listening environment reproducing a source at a source location for a listener at a listener location.

FIG. 1C shows another example of a virtual listening environment 114. In this example, the virtual listening environment 114 recreates the audio stream generated by a source 120 for a listener 130 using multiple audio playback devices 150. In this example, the environment 114 includes an audio filter (e.g., "$F_1$" and "$F_2$") that can generate an audio stream that approximates the source 120 at the source location. That is, the listener 130 perceives the audio stream generated by the audio playback devices 150 as if it originated from the source location.

II. System Environment

Figure 2:
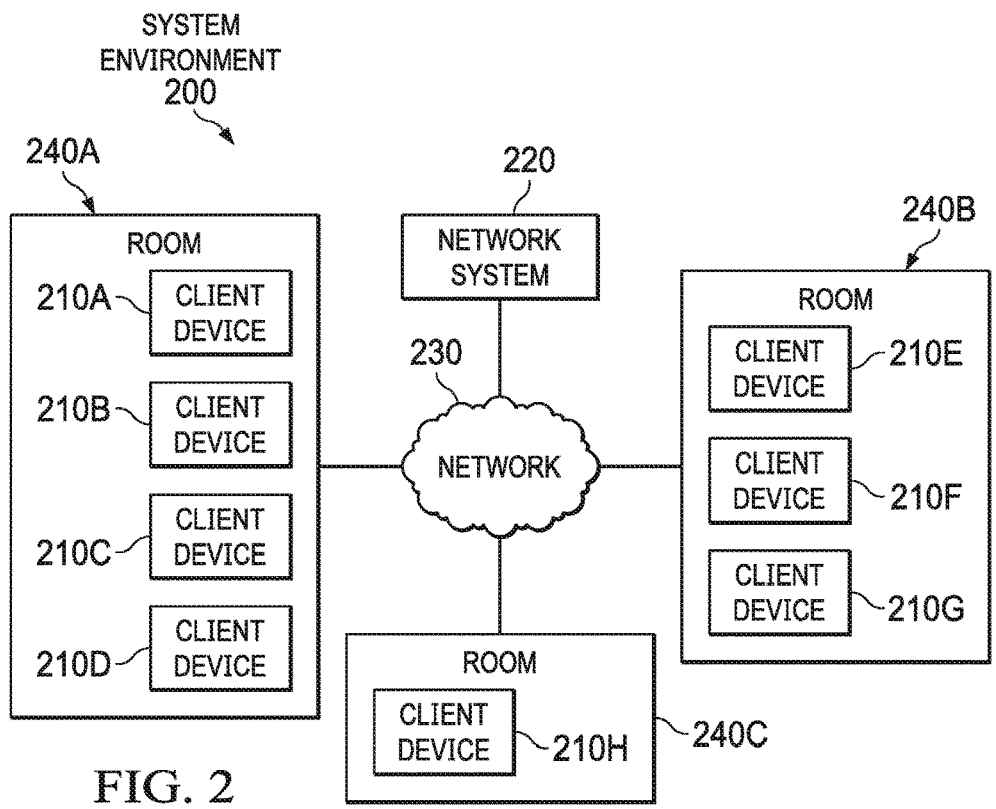
FIG. 2 is a diagram of a system environment for dynamically generating a listening environment that reproduces sources at source locations for a listener at a listener location.

FIG. 2 shows an example system environment 200 for a generating an audio stream for a web-conference ("conferencing session") using a computation device (host), according to some embodiments. The computation device may correspond to, implement, comprise, or be comprised by, an audio processing module. In this example, the system environment 200 includes numerous client devices 210, a network system 220, and a network 230. The client devices may be mobile phones, such as smartphones, for example. Further, the client devices may have an audio capture capability and/or an audio rendering capability. In the system environment 200, the client devices 210 are in different locations. Here, the locations (or acoustic spaces) are three rooms 240A, 240B, and 240C. In other examples, there can be any number of additional or fewer locations (or acoustic spaces) and may be any other location that can be used to facilitate web-conferencing. In this particular example, room 240A includes client devices 210A-210D, room 240B includes client devices 210E-210G, and room 240C includes client device 210H. In other examples, each room may have any number of client devices 210. The rooms 240A, 240B, and 240C, and any other rooms or locations mentioned throughout the disclosure may be said to correspond to respective acoustic spaces or listening environments. In some embodiments however, a physical room (e.g., a large room such as a classroom or lecture hall) may include several separate acoustic spaces.

Within the environment 200, each client device 210 is operated by a user. Any number of users may each operate a client device 210 to connect to a conferencing session via a network 230. Within a conferencing session users operating the client devices 210 are able to communicate with one another as if they were in the same room 240 despite being in different rooms 240. The conferencing session (or teleconference) may be hosted by a client device 210 and/or the network system 220 (e.g., by a network-connected, web-connected, or cloud-connected server) within the environment 200.

Each client device 210 may generate a first audio stream by recording (capturing) the speech of a user operating the client device 210 or by recording (capturing) the speech of any other users in the same room 240 (e.g., acoustic space) as the client device 210. The recorded audio stream (first audio stream) is transmitted to another client device 210 and/or the network system 220 via the network 230. In general, the generated first audio stream is transmitted to the host of the teleconference. A client device 210 and/or network system 220 generates a representative audio stream from the received audio stream(s) using an audio processing unit. A representative audio stream is an audio stream that, when played back using an audio play back device in a room (e.g., 240 A), either (1) approximates a user(s) at their location(s) within the room in which they were recorded (e.g., 240B), or (2) approximates a user(s) at a virtual location while respecting their relative position between one another. In other examples, the representative audio stream spatially renders users from other rooms (e.g., 240B) in the room (e.g., 240A) of the audio play back device(s). Whatever the configuration, the representative audio stream allows a user(s) in one room to perceive speech from users in another room at distinct spatial locations. In some examples, the client devices 210 can form an array and the array may be used to generate an audio stream and/or play back a representative audio stream. The representative audio stream may relate to a plurality of second audio streams that are transmitted to respective client devices for rendering. For example, there may be one such second audio stream for each of the client devices participating in the teleconference.

Figure 3A:
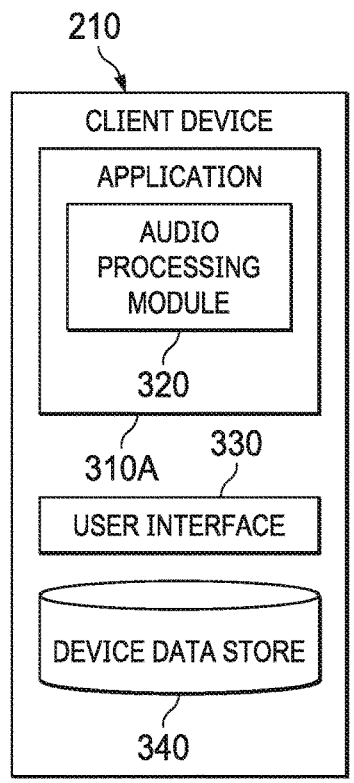
FIGS. 3A-3B are diagrams of client devices in the system environment.
Figure 3B:
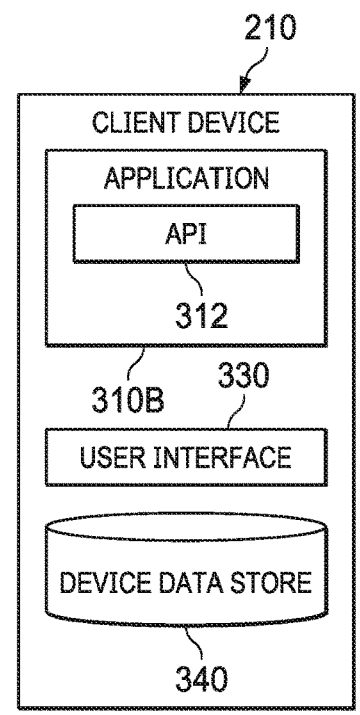

FIG. 3A and FIG. 3B illustrate example client devices 210 that can participate in a conferencing session. Each client device 210 is a computer or other electronic device used by one or more users to perform activities including recording and/or capturing audio, playing back audio, and participating in a conferencing session. Client device 210, for example, can be a personal computer executing a web browser or dedicated software application that allows the user to participate in conferencing sessions with other client devices 210 and the network system. In other embodiments, a client device 210 is a network-capable device other than a computer, such as a mobile phone (or client device), personal digital assistant (PDA), a tablet, a laptop computer, a wearable device, a networked television or "smart TV," smart speakers, a home assistant, etc.

The client devices 210 include software applications, such as application 310A, 310B (generally 310), which execute on the processor of the respective client device 210. The applications 310 may communicate with one another and with network system 220 (e.g. during a conferencing session). The application 310 executing on the client device 210 additionally performs various functions for participating in a conferencing session. Examples of such applications can be a web browser, a virtual meeting application, a messaging application, a gaming application, etc.

An application, as in FIG. 3A, may include a host (e.g., an audio processing module 320). The host generates a representative audio stream (e.g., plural second audio streams) for a conferencing session such that users operating client devices 210 in a first location (e.g., room 240A) can perceive users from different locations (e.g., room 240B) at spatial locations within the first location. Generating a representative audio stream is described in more detail in Section III. The host (e.g., audio processing module 320) can initiate a conferencing session. The host can configure a client device 210 or an array of client devices 210 for the conferencing session. Here and in the following, an array of client devices may be understood to correspond to a group of client devices. Configuring a client device 210 (or client devices) for a conferencing session is described in Section IV. Any number of client devices 210 can connect to the conferencing session via the network 230. Because the audio processing module 320 can be located on a client device 210 or a network system 220, the conferencing session can be hosted on either a client device 210 or a network system 220 (e.g., the hosting device or server).

A user operating a client device 210 may participate in a conferencing session by connecting to the conferencing session (e.g., to the host of the conferencing session) via network 230. Within a conferencing session, each user may be associated with a virtual user located at a virtual location (virtual source locations). That is, each user connected to a conferencing session may have both a location in the real-world and a virtual location in the virtual-world of the conferencing session.

A client device 210 may include a user interface 330. The user interface 330 includes an input device or mechanism (e.g., a hardware and/or software button, keypad, microphone) for data entry and output device or mechanism for data output (e.g., a port, display, speaker). The output devices can output data provided by a client device 210 or a network system 220. For example, a listener using a listener client device 210 can play back a representative audio stream using the user interface. The input devices enable the user to take an action (e.g., an input) to interact with the application 310 or network system 220 via a user interface 330. These actions can include: typing, speaking, recording, tapping, clicking, swiping, or any other input interaction. For example, a talker (or presenter) using a talker client device 210 can record their speech as an audio stream using the user interface 330. In some examples, the user interface includes a display that allows a user to interact with the client devices 210 during a conferencing session. The user interface 330 can process inputs that can affect the conferencing session in a variety of ways, such as: displaying audio filters on the user interface, displaying virtual locations on a user interface, receiving virtual location assignments, displaying all users connected to a conferencing session for grouping, or any of the other interactions, processes, or events described within the environment 200 during a conferencing session.

The device data store 340 contains information to facilitate conferencing sessions. In one example, the information includes stored groupings of client devices 210, audio parameters for a particular room, audio filters, etc.

Figure 3C:
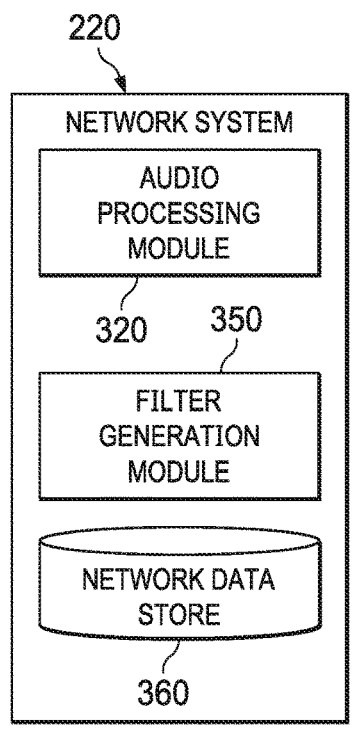
FIG. 3C is a diagram of a network system in the system environment.

FIG. 3C illustrates a diagram of a network system 220 for facilitating conferencing sessions between client devices 210 via the network 230. The network system 220 includes an audio processing module 320, a filter generation module 350, and a network data store 360. The audio processing module 320 of the network system 220 functions similarly to the audio processing module 320 of a client device 210. The filter generation module 350 can function to generate audio filters that create a representative audio stream from received audio streams. The network data store 360 contains information to facilitate conferencing sessions.

The network system 220 and client devices 210 include a number of "modules," which refers to hardware components and/or computational logic for providing the specified functionality. A module can be implemented in hardware, firmware, and/or software (e.g., a hardware server comprising computational logic). It will be understood that the named components represent one embodiment of the disclosed method, and other embodiments can include other components. In addition, other embodiments can lack the components described herein and/or distribute the described functionality among the components in a different manner. Additionally, the functionalities attributed to more than one component can be incorporated into a single component. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the media hosting service, loaded into memory, and executed by one or more processors of the system's computers.

Returning to FIG. 2, the network 230 represents the communication pathways between the client devices 210 and the network system 220. In one embodiment, the network 230 is the Internet, but can also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

III. Generating a Representative Audio Stream for a Conferencing Session

An audio processing module 320 (or in general, the host of the teleconference) generates a representative audio stream (e.g., a plurality of second audio streams for rendering by respective client devices) for use in a conferencing session. Generating a representative audio stream that allows users in a first location (e.g., room 240A, or first acoustic space in general) to spatially perceive users from a second (or more) locations (e.g., room 240B, or second audio spaces in general) at distinct locations within the first location is a challenging problem.

In traditional conferencing sessions, multiple users place their client devices 210 on a conference table for a conferencing session. In this situation, conferencing sessions can suffer audio issues if multiple client devices 210 on the conference table are both recording audio streams and playing back representative audio streams. Generally, users overcome this problem by muting all microphones (e.g., on a client device) but one of the microphones on the conference table during a conferencing session.

This situation has several drawbacks. For example, recorded audio streams will be loud for users closest to the unmuted client device 210 and soft for users furthest from the unmuted client device. Variations in recorded audio stream volume results in poor conversation quality between users in different rooms 240 during the conferencing session. For example, the user closest to the microphone is heard louder than other users when the recorded audio stream is played back in another room 240. Additionally, real-world actions (e.g., typing, shifting paper, etc.) near the microphone can appear loud and degrade the conversation in a conferencing session.

The host (e.g., audio processing module 320) can leverage each client device 210 as a microphone (or speaker) in a distributed microphone (or speaker) array. More generally, client devices 210 in the same room may be described as a client device array or, correspondingly, as a group of client devices. In this situation, the host may record audio streams (e.g., first audio streams) from client devices in a client device array (e.g., in a group of client devices) and the host may process the audio stream(s) to generate a representative audio stream or streams (e.g., the plurality of second audio streams). The representative audio stream(s) allows client devices 210 to play back the representative audio stream(s) such that users can spatially distinguish various users in the played back representative audio stream(s), or such that overall loudness of the played back audio is enhanced (e.g., if some or all client devices in a group play back the same second audio streams).

The audio processing implemented by the host (e.g., audio processing module 320) can accomplish many functions when generating the representative audio stream(s). The following sub-sections describe some of the functionality of the host when generating a representative audio stream.

Figure 10:
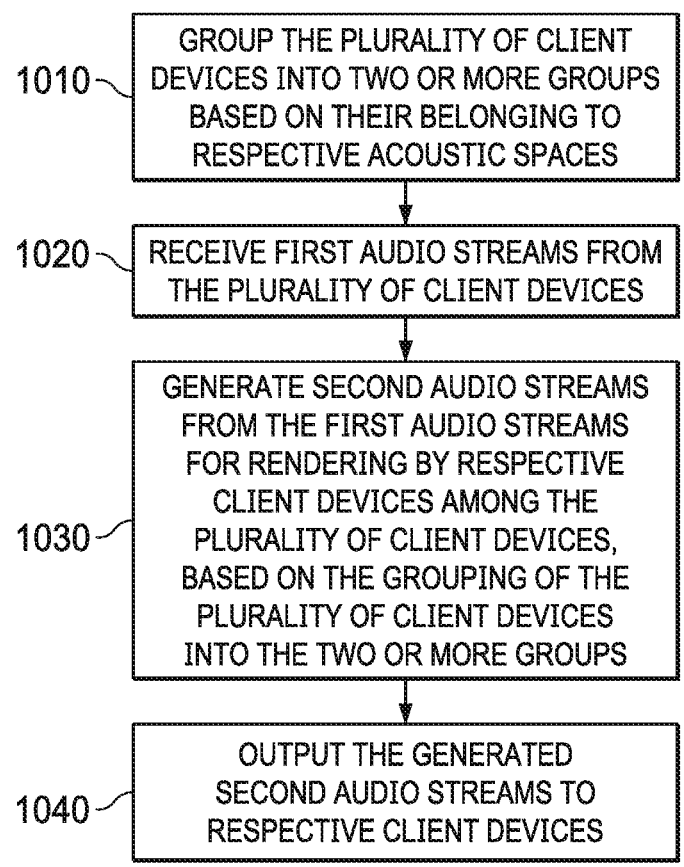
FIG. 10 is a flow diagram of an example of a method of hosting a teleconference.

An example of a method for hosting a teleconference among a plurality of client devices in different acoustic spaces (e.g., rooms) is illustrated in the flow diagram of FIG. 10. This method may be performed by a host of the teleconference, such as a client device or a server, for example. It is assumed that each client device has an audio capturing capability (audio recording capability) and/or (preferably both) an audio rendering capability (audio replay capability). At step 1010, the plurality of client devices are grouped into two or more groups based on location. For example, the client devices may be grouped into two or more groups based on their belonging to respective acoustic spaces. In the example of FIG. 2, the client devices may be grouped into three groups, one for each of rooms 240A, 240B, 240C. At step 1020, first audio streams (recorded or captured audio streams) are received from the plurality of client devices. For example, one first audio stream may be received from each client device. From the host's perspective, the first audio streams are incoming audio streams. At step 1030, second audio streams (representative audio streams) for rendering by respective client devices are generated based on the grouping of the client devices into the two or more groups. For example, in some implementations one second audio stream may be generated for each client device. From the host's perspective, the second audio streams are outgoing audio streams. At step 1040 the generated second audio streams are output (e.g., transmitted) to respective client devices for rendering.

The aforementioned grouping based on in which acoustic space the client devices are present does not preclude further grouping operations. For example, each of the groups determined based on in which acoustic space the client devices are present can be further subdivided based on additional grouping criteria. Thus, in some implementations, grouping the plurality of client devices into two or more groups may be further based on additional grouping criteria. The additional grouping criteria may include at least one of operating systems of the client devices, and CPU availabilities of the client devices.

III.A Intra-Room Audio Stream Rendering

In one example, the host (e.g., audio processing module 320) can prevent rendering audio streams received from intra-room users (e.g., intra-group users). Take, for example, a conferencing session in which all of the users are listening to the conferencing session using a pair of headphones. In this case, when a first user in a first room 240A speaks, a second user in the first room 240A may hear the first user speak twice. That is, the second user will hear the first user speak in a traditional manner followed by hearing them speak when the audio signal representing the speech of the first user is played back on their headphones. Accordingly, the host may prevent the audio streams (first audio streams) generated by users in the same room from being played back (as parts of second audio streams) to other users in the same room. That is, using the previous example, the host prevents the audio stream representing the speech of the first user from being played back to the second user. As such, the second user only hears the first user speak once in the conferencing session.

In general, for a given group of client devices (e.g., located in a given room), first audio streams from client devices in the given group of client devices are not used for generating second audio streams for the client devices in the given group of client devices. That is, a first audio stream from a client device in a given group of client devices (e.g., in a given room) is not used for generating second audio streams for any client devices in the same group of client devices. Put differently, a first audio stream from a client device in a given group of client devices is only used for generating second audio streams for client devices in groups of client devices other than the given group of client device (e.g., for client devices in other rooms).

On the other hand, for a large physical room, such as a big meeting room, a classroom, or a lecture hall, the proposed method may be used as a sound reinforcement solution. In one example, a talker may be presenting something on a whiteboard on one side of the room. The farthest listeners may be located on the other side in the same room. Then, two groups of client devices could be defined in the physical room, a first one at the room's end of the presenter, a second one at the other end. Client devices in the first group could be used to capture the presenter's speech and the client devices in the second room could be used to render it to listeners at the other end of the room. When doing so, signal processing techniques to avoid "Larsen" (i.e., audio looping) can be used, or distance/volume monitoring can be put in place to allow or not such a feature.

III.B Audio Stream Enhancement

The host (e.g., audio processing module 320) can enhance an audio stream recorded by client devices 210. That is, for example, the host can leverage the microphones of multiple client devices 210 in a group of client devices (e.g., in a room) to improve the quality of speech recorded in an audio stream and more accurately spatially resolve users who are speaking in a room 240.

For example, when using the microphones of a distributed client device array, the host (e.g., audio processing module 320) can analyze all received audio streams to determine if there is an active sound source (e.g., if someone is speaking) in a given audio space (e.g., in a given room). If there is an active sound source, the host (e.g., the audio processing module) may determine or select a client device 210 from the array (e.g., group) nearest the active sound source and use only the received first audio stream from that client device 210. First audio streams from other client devices in the same group (e.g., room) may then be disregarded (e.g., by muting respective first audio streams). The first audio stream from the selected client device can be used as a source audio stream (or can be used as basis for generating a source audio stream) that represents captured audio for the currently active sound source. In this case, the representative audio stream(s) or second audio streams are generated based on the source audio stream only. Needless to say, first audio streams from client devices in groups other than the group of the selected client device are disregarded as well when generating the source audio stream.

Usually, the client device 210 nearest the speaking user has the highest input signal quality (e.g., input level, signal to noise ratio, and/or direct to reverberant ratio) and is used to generate a representative audio stream (e.g., second audio streams for respective client devices). Accordingly, determining the nearest or closest client device to an active sound source in a given acoustic space can be based on any or all of measuring sound volumes of audio events in first audio streams from client devices in a group corresponding to the given audio space, and measuring times of arrival of audio events in first audio streams from client devices in a group corresponding to the given audio space. Considering sound volumes for selecting the nearest client device may require that there is a pre-calibration step in which the input and/or output volumes of the client devices are aligned within each group (e.g., within each room). Considering times of arrival of audio events may require or imply that the relevant first audio streams are time-synchronized. Methods and techniques for volume alignment or time alignment are described elsewhere in this disclosure.

In another example, the host (e.g., audio processing module 320) can perform beam forming on the received audio streams to spatially filter a received audio stream. Spatially filtering the received audio stream using beam forming allows the host to record a single talker in a given direction while not recording other talkers in other directions. In this manner a client device 210 may record a particular talker speaking into a particular microphone (e.g., client device) rather than recording all talkers near the client device 210. In one example, the host (e.g., audio processing module 320) may use a delay and sum beam-former, but could use other beam forming techniques. A delay and sum beam-former time aligns and sums the various received audio streams, but could be any other beam forming technique.

Thus, in general, generating the second audio streams may comprise, for an active sound source in a given acoustic space, applying a signal processing technique to the first audio streams from client devices that are grouped in a group corresponding to the given acoustic space, to generate a source audio stream that represents captured sound (or captured audio) for the currently active sound source. Thereby, the fact that multiple client devices are present in the same acoustic space (e.g., room) can be leveraged for improving sound quality of the source audio stream. The generated source audio stream can then be used for generating the second audio streams, as in the foregoing example. In accordance with the above, the signal processing technique may relate to a beamforming technique, for example, such as delay and sum beamforming.

In some examples, the host (e.g., audio processing module 320) selects a signal processing technique (e.g., beamforming technique) based on a variety of criteria including, for example, latency and computational requirements for client devices 210. For instance, when using the delay and sum technique, time alignment between microphone signals requires to delay the 1st arriving microphone signals until the last microphone signal arrive. The maximum applied delay may conform to quality constraints such as audio-visual synchronization in case of video-conferencing (e.g., ±22 ms) or one way latency delay for VOIP applications (max of 150 ms).

In another example, the host (e.g., audio processing module 320) can perform localization to determine the position of talkers in a location. Localization data can be used to generate a representative audio stream (e.g., respective second audio streams) for client devices 210 in a different location. The determined spatial locations can be used to generate a representative audio stream (e.g., respective second audio streams) that reflects the determined spatial locations of recorded users. That is, for at least one group (or array) of client devices, the method of hosting the teleconference may include determining a relative spatial arrangement (i.e., spatial locations) of the client devices in the respective group of client devices. Then, generating the second audio streams can be further based on the determined relative spatial arrangement of client devices in the at least one group of client devices.

In some instances, the determined spatial locations may be communicated between users participating the conferencing session. For example, all users and their determined positions in a first room 240A may be displayed on a client device 210 of a user in the second room 240B.

One example localization technique is time difference of arrival (TDOA) which analyzes recorded audio streams from all microphones to estimate the direction of a sound source. In other configurations, other acoustic characteristics or signal processing techniques can be used (such as level differences, microphone directivity, etc.) to determine the position of users in a location. In general, the relative spatial arrangement for a given group may be determined by any or all of measuring sound volumes of audio events in first audio streams from client devices in the given group, measuring times of arrival of audio events in first audio streams from client devices in the given group, receiving user input (e.g., via a GUI), and/or visual inspection by one or more video cameras. The one or more video cameras may be video cameras provided with respective client devices, or they may be video cameras provided for respective rooms in which the participants of the teleconference are located.

Generally, the host (e.g., audio processing module 320) operates to generate a representative audio stream using a set amount, or less than a set amount, of processing power while keeping the audio latency low in order to achieve a high quality conferencing session.

III.C Spectral Coloration for Audio Playback

The host (e.g., audio processing module 320) can playback a representative audio stream (e.g., a corresponding plurality of second audio streams) using one or more client devices 210 in a group of client devices (e.g., the client devices in a given room). For example, the host generates a representative audio stream (e.g., plural second audio streams for respective client devices) from speech recorded from users operating client devices 210 in a first room 240A. The host transmits the representative audio stream to client devices 210 in a second room 240B and the representative audio signal is played back on multiple devices. In this example, the loudness of the representative audio stream is distributed across multiple client devices 210 such that users in the second room 240B can more clearly perceive the representative audio stream. However, in this example, the differing locations of the client devices 210 in the second room may cause variations in gain and spectrum between users due to the variations in acoustic propagation throughout the room. That is, the second audio streams for the client devices in a given group (e.g., room) may be generated to be the same for all client devices in the given group of client devices, so that the client devices in the given group play back the same audio signal.

III.D User Assignment for Audio Playback

The host (e.g., audio processing module 320) can spatially distribute a received representative audio stream to different client devices 210. This can be done by generation of appropriate second audio streams for the different client devices 210. For example, a received representative audio stream (e.g., second audio streams for respective client devices 210) includes audio data representing a number of users at a number of user locations in a first room 240A. Users in a second room can assign a client device 210 to play back the representative audio stream representing a single user in the first room. That is, loudspeakers in each client device 210 in the second room can act as a location from which users in the first room can be perceived as speaking from. In such case, there would be a one-to-one correspondence between first audio streams (or source audio streams) from a first group (e.g., first room) and second audio streams for client devices in a second group (e.g., second room). This allows to achieve spatial localizations of sound sources (e.g., talkers in the teleconference) in a particularly simple and efficient manner. In other implementations, sound from a specific client device from the first group can be rendered to two or more client devices in the second group (e.g., if there are more client devices in the second group than in the first group). In other implementations, sound from two or more specific client devices from the first group can be rendered to a single client device in the second group (e.g., if there are more client devices in the first group than in the second group). These approaches can be implemented in the context of matrixing techniques described further below.

III.E Echo Cancellation

The host (e.g., audio processing module 320) can actively cancel echo effects that occur in a representative audio stream. For example, when a representative audio stream is played back through a distributed array (e.g., group) of client devices 210, the representative audio stream(s) may be captured by client devices 210 in that array and become echo signals in the representative audio stream. The host can cancel the echo effects such that they are not produced in the representative audio stream as it is played back on a distributed array of client devices 210.

In one example, the host may perform single-channel (mono-channel) echo cancellation for individual client devices to suppress a representation of the second audio stream received by the respective client device in the first audio stream output by the respective client device. This may be done for any, some, or all of the client devices. In another example, the host may perform multi-channel echo cancellation for individual groups of client devices to suppress representations of the second audio streams received by the client devices in the respective group of client devices in the first audio streams output by the client devices in the respective group of client devices. This may be done for any, some, or all of the groups (e.g., rooms).

IV. Example Conferencing Session

Figure 4A:
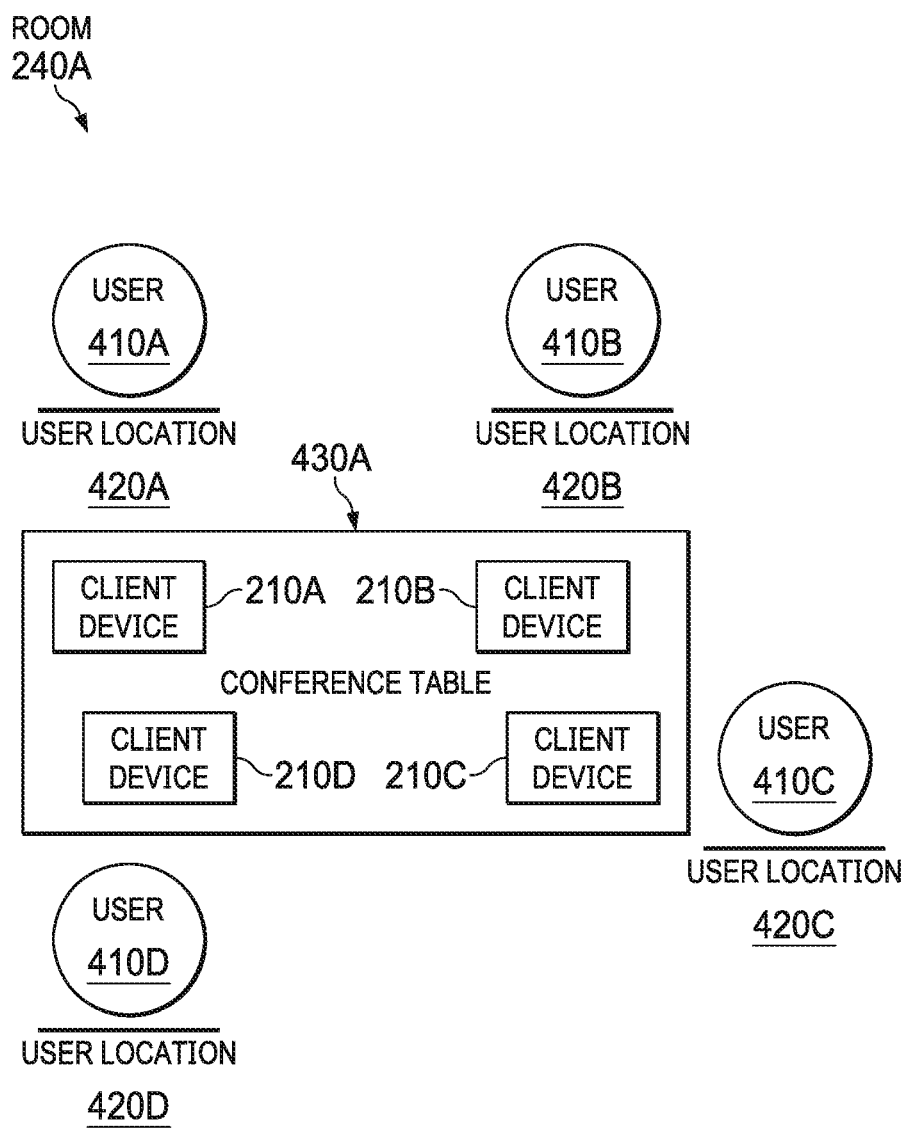
FIG. 4A is an illustration of a first location in the system environment showing users at user locations alongside their client devices.
Figure 4B:
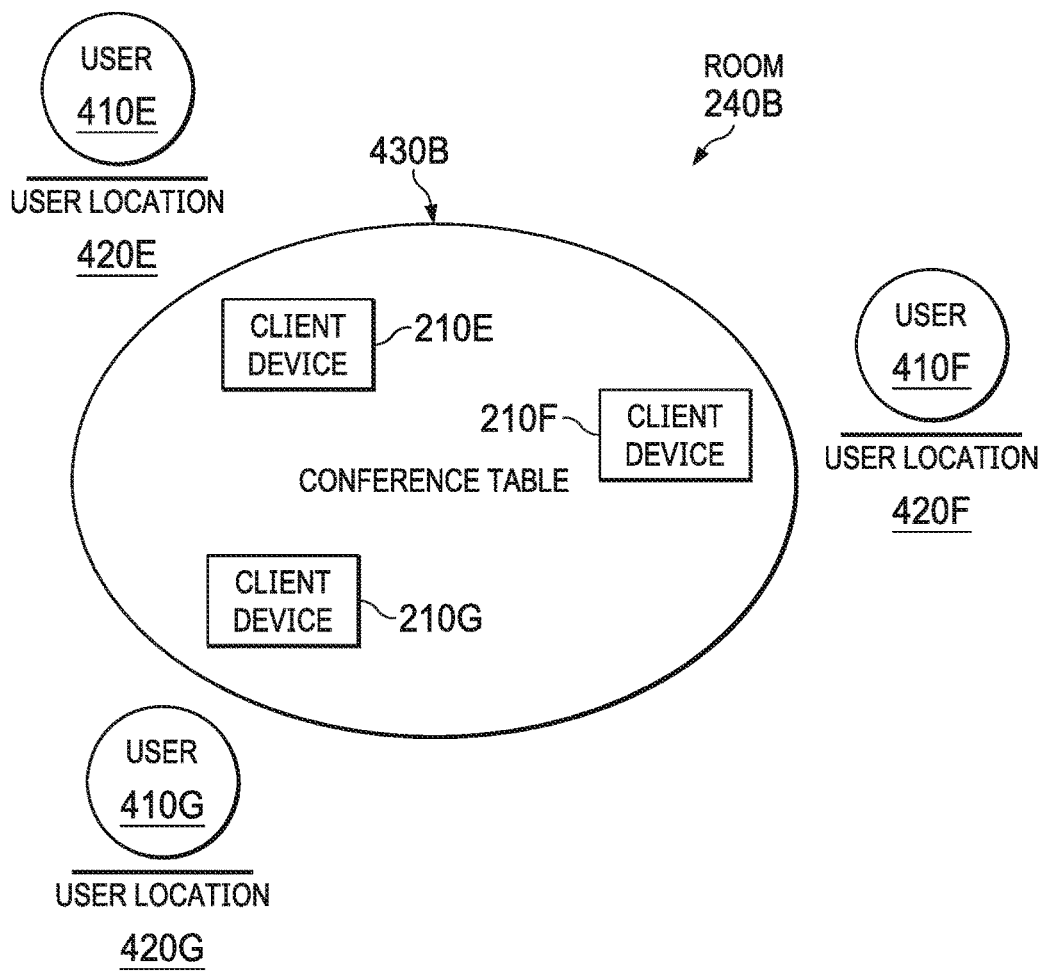
FIG. 4B is an illustration of a second location in the system environment showing users at user locations alongside their client devices.
Figure 4C:
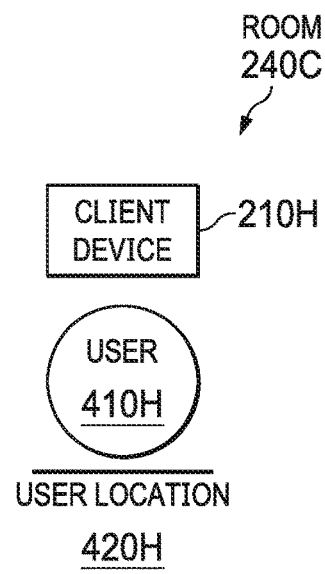
FIG. 4C is an illustration of a third location in the system environment showing a user at a user location alongside her client device.

FIGS. 4A-4C illustrate example rooms 240 including multiple users operating client devices 210 who are to participate in a conferencing session (teleconference) within system environment 200.

FIG. 4A illustrates an example of a first room 240A. The first room 240A includes four users 410 at user locations 420 operating a client device 210. Each user 410 is operating a client device 210 denoted by a similar letter (e.g., user 410A at user location 420A is operating a client device 210A). Each user 410 is sitting around a conference table 430 and each user has placed their client device 210 on the conference table 430 in front of them. FIG. 4B illustrates an example of a second room 240B. The second room 240B includes three users 410 at user locations 420 operating a client device 210. Again, the users are all sitting around a conference table 430B and each user has placed their client device 210 on the conference table 430B in front of them. FIG. 4C illustrates an example of a third room. The third room 240C includes a single user 410 at a user location 420 operating a client device 210. In this case, the user 410 is holding their client device 210 and is not using a conference table.

V. Representative Audio Stream for Headphones

Figure 5A:
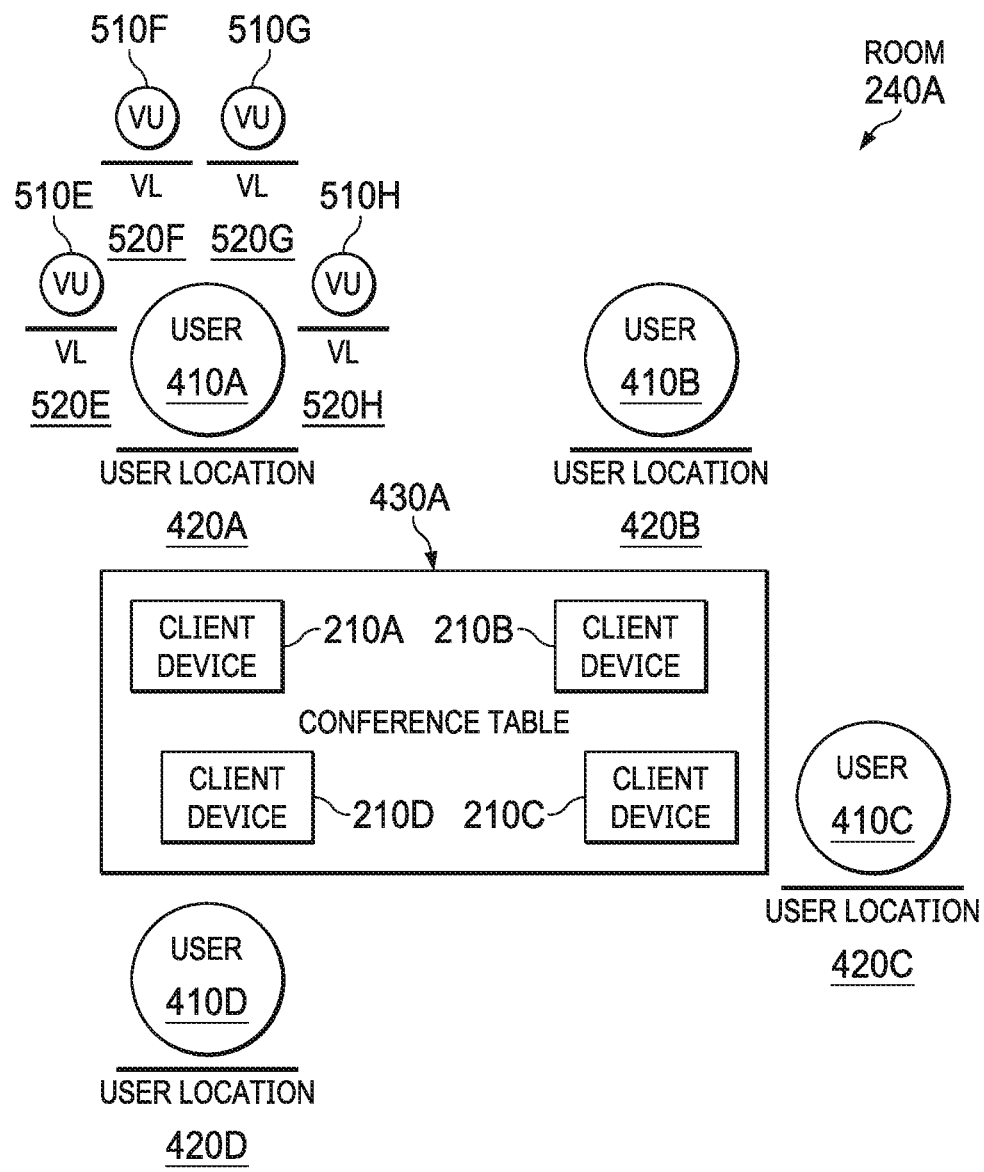
FIG. 5A is an illustration of the first location including a representation of virtual users at virtual locations reproduced using the earphones of a user at the first location, the virtual users corresponding to users in the second location and the third location.
Figure 5B:
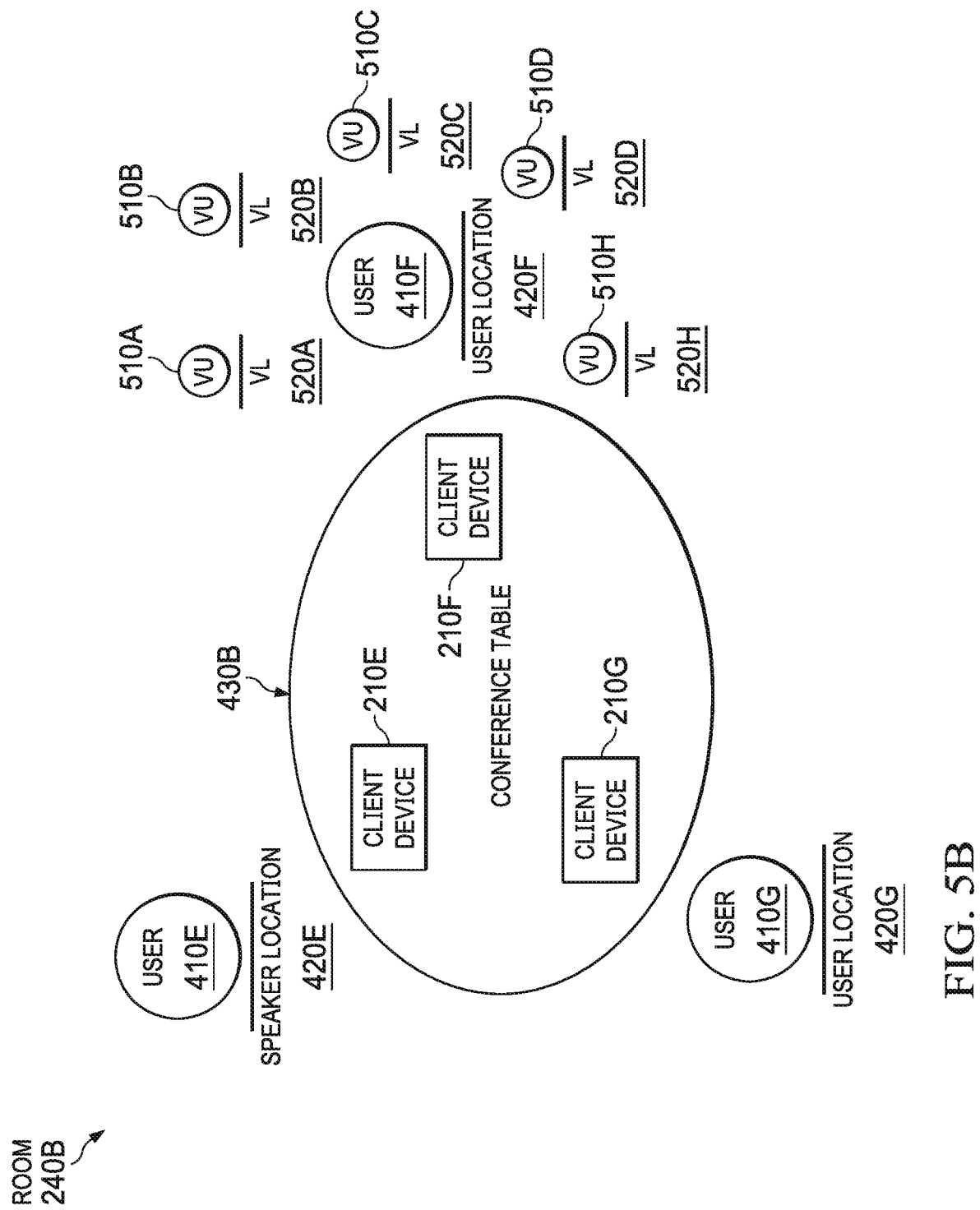
FIG. 5B is an illustration of the second location including a representation of virtual users at virtual locations reproduced using the earphones of a user at the second location, the virtual users corresponding to users in the first location and the third location.
Figure 5C:
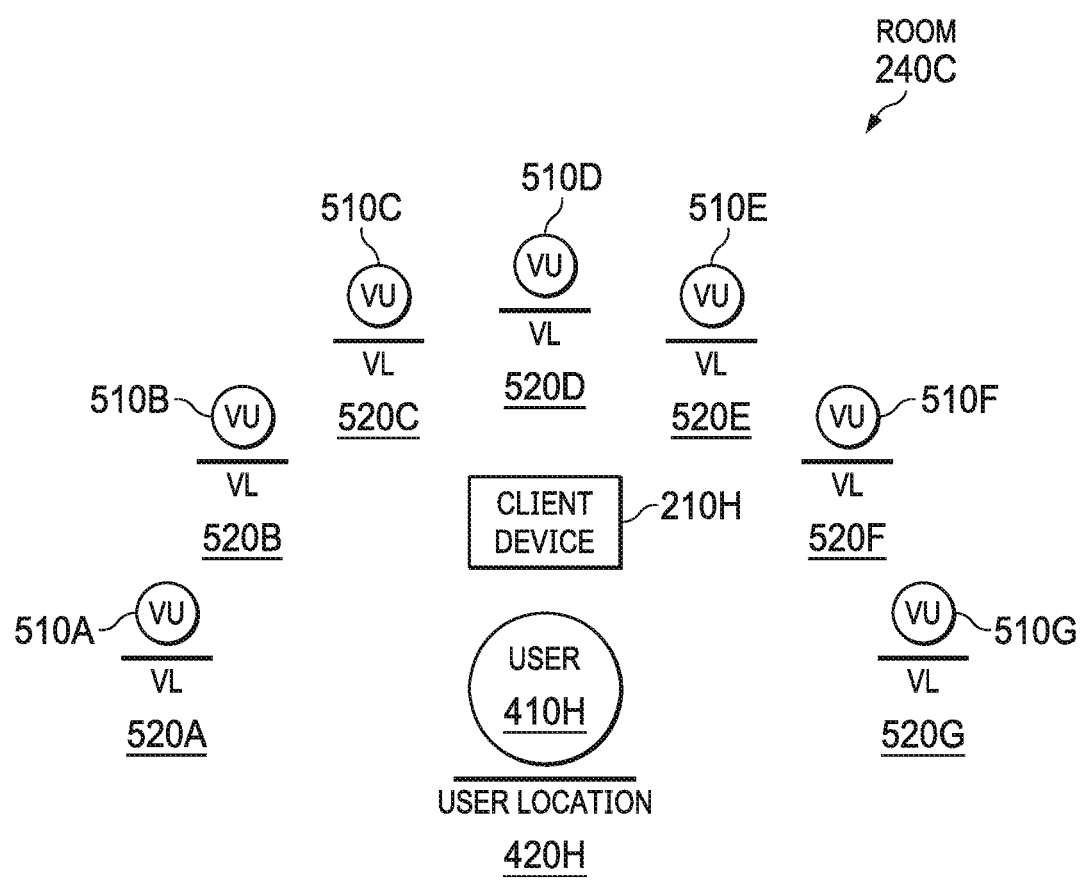
FIG. 5C is an illustration of the third location including a representation of virtual users at virtual locations reproduced using the earphones of a user at the third location, the virtual users corresponding to users in the first location and the second location.

FIGS. 5A-5C illustrates example rooms 240 including users 410 at user locations 420 participating in a conferencing session. Each client device 210 in the rooms 240 are connected to the conferencing session and records audio from their users. The recorded audio streams (first audio streams) are transmitted to the hosting device or host (a client device 210 or a network system 220). The host (e.g., audio processing module 320) generates a representative audio stream (i.e., second audio stream) for each client device 210 in the conferencing session using the received audio streams. The hosting device transmits the representative audio stream(s) to the appropriate client device(s) 210. Each user 410 listens to the representative audio stream using a pair of headphones (not illustrated) connected to their client device 210.

FIG. 5A illustrates an example of a first room 240A participating in the conferencing session. FIG. 5A also illustrates the virtual locations ("VL") 520 of virtual users ("VU") 510 as perceived by a user 410A in a user location 420A while listening to the representative audio stream. Each virtual user 510 is associated with a user 410 in another room 240 with the corresponding letter. For example, virtual user 510E at virtual location 520E is associated with the user 410E at the location 420E in the second room 240B.

Although not illustrated, each user 410 illustrated is listening to a representative audio stream that allows the user 410 to spatially perceive users 410 in other rooms 240 as virtual users 510 at virtual locations 520. Each user 410 listening to the representative audio stream in the conferencing session may perceive each of the virtual users 510 at virtual locations 520 corresponding to the users 410 at locations 420 in their respective rooms 240. For example, the virtual users from room 240B may be perceived by a user in room 240A in the same orientation as they are around conference table 430B in room 240B. However, in other examples, the representative audio stream can represent the virtual users 510 at any virtual location 520 such that a user 410 listening to the representative audio stream can spatially resolve each virtual user 510 at a virtual location 520.

FIG. 5B illustrates an example of the second room 240B participating in the conferencing session. Here, the illustration includes the virtual locations 520 of virtual users 510 in the other rooms 240 as perceived by user 410F in user location 420F. While not illustrated, every talker at the conference table in the second room also can perceive users from other rooms 240 as virtual users 510 at virtual locations 520.

FIG. 5C illustrates an example of the third room 240C participating in the conferencing session. Here, the illustration includes the virtual locations 520 of virtual users 510 in the other rooms 240 as perceived by user 410H in user location 420H.

In general, the host may detect, for each client device, whether the respective client device renders audio via headphone loudspeakers. Then, for each client device that is determined to render audio via headphone loudspeakers, the host may generate the second audio stream for the respective client device to include captured audio from all active sound sources. That is, the host may not attempt to leverage the fact that multiple client devices are present in the same room for improving quality of audio playback in this case. Generating the second audio streams for the client devices using headphone loudspeakers may involve assigning sound sources (e.g., talkers) in other rooms to virtual source locations, and applying binaural filtering of the first audio streams (or source audio streams generated therefrom) to produce a second (binaural) audio stream that when rendered by the headphone speakers, gives the user the impression that the sound sources are located at respective virtual source locations.

VI. Representative Audio Stream for Audio Playback Devices

Figure 6A:
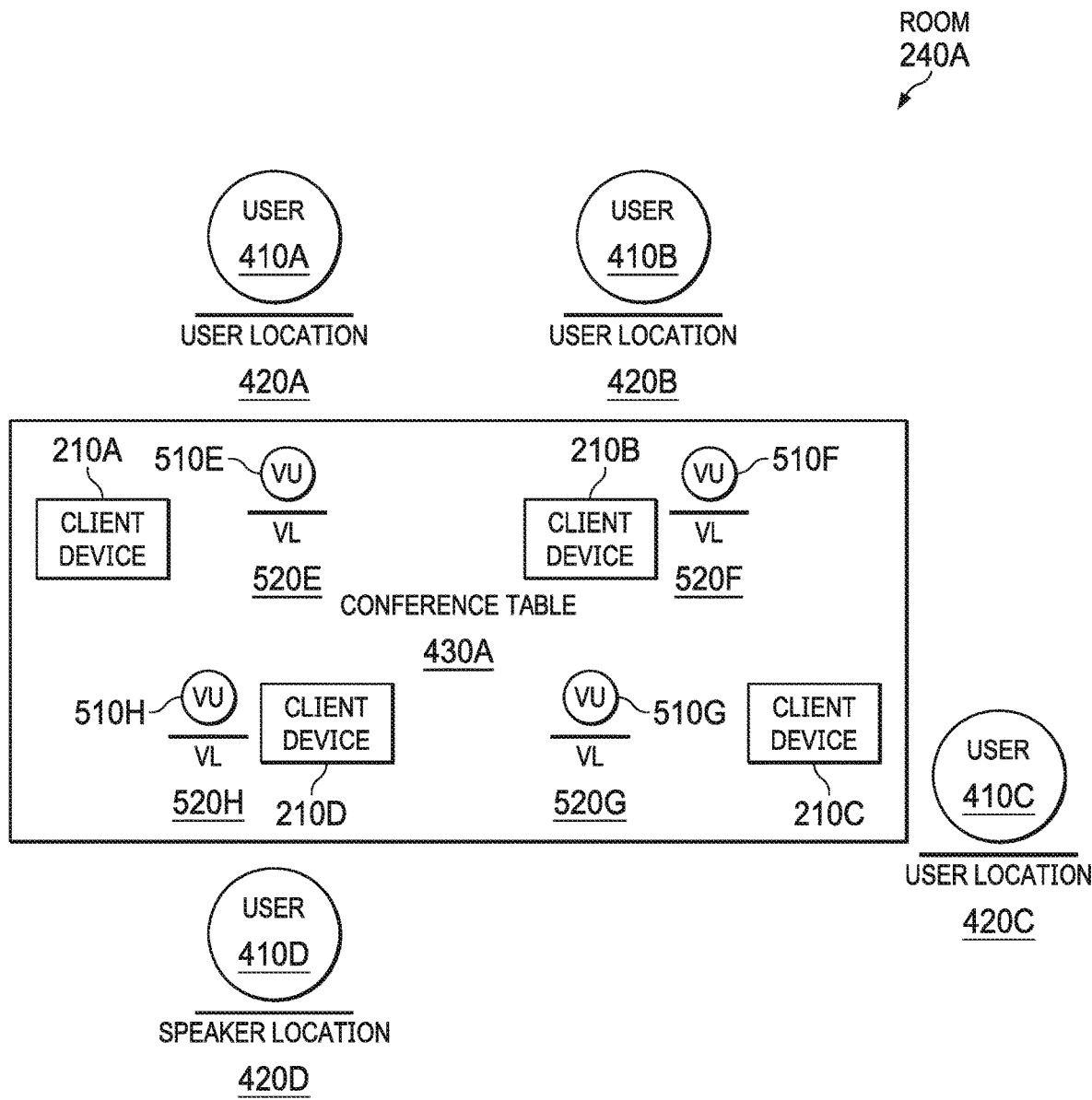
FIG. 6A is an illustration of the first location including a representation of virtual users at virtual locations reproduced using the client devices of users at the first location, the virtual users corresponding to users in the second location and the third location.
Figure 6B:
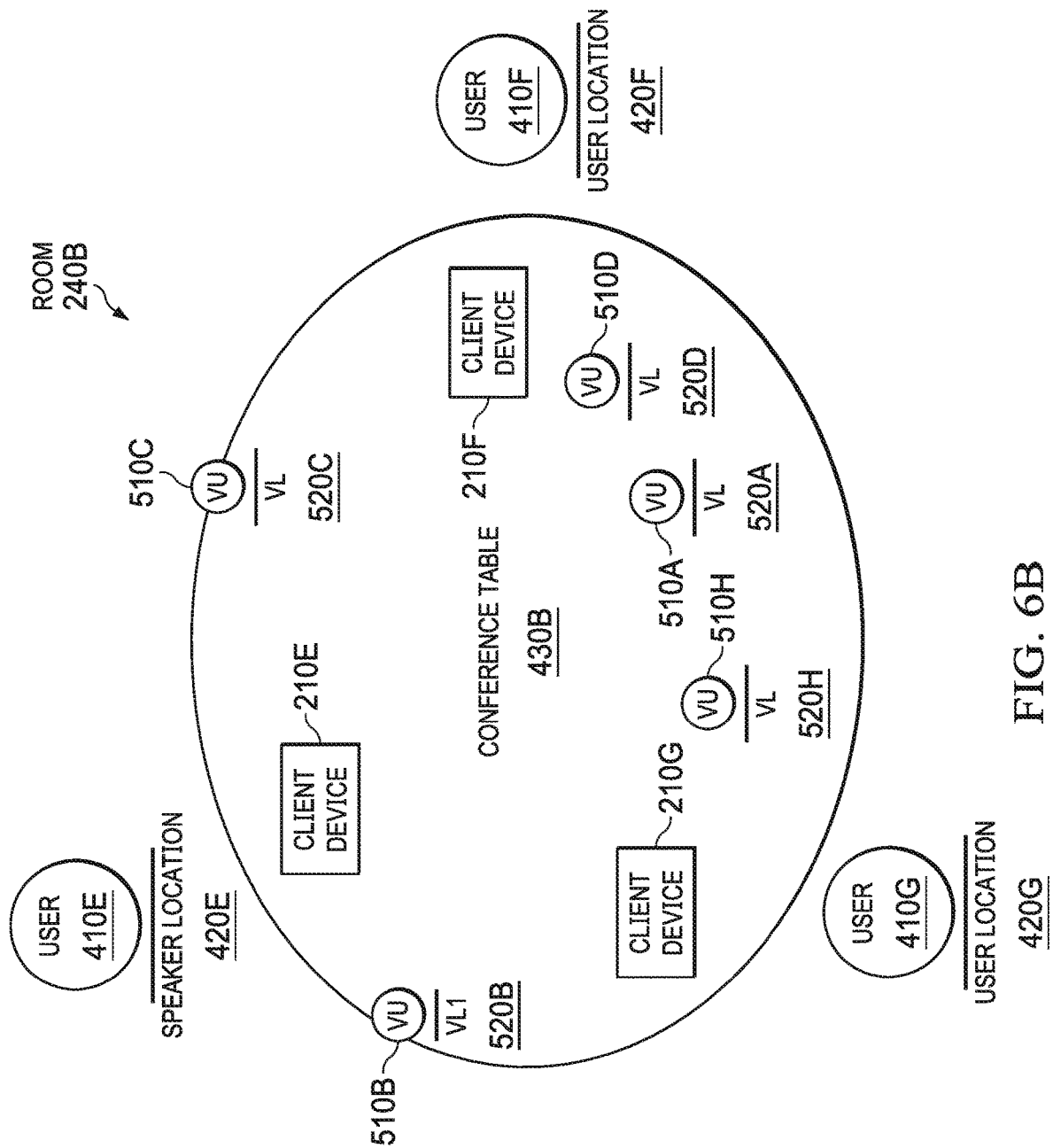
FIG. 6B is an illustration of the second location including a representation of virtual users at virtual locations reproduced using the client devices of users at the second location, the virtual users corresponding to users in the first location and the third location.

FIGS. 6A-6B illustrate example rooms 240 (e.g., corresponding to respective groups of client devices) whose users are participating in a conferencing session. The conferencing session is similar to the conferencing session described in FIGS. 5A-C. However, in this example, the host (e.g., audio processing module 320) generates a representative audio stream that can be played back on the loudspeakers of client devices 210 in each room 240 (instead of by headphone loudspeakers). Again, the representative audio stream (e.g., plurality of second audio streams) may represent different virtual users 510 and different virtual locations 520 such that the users 410 listening to the representative audio stream can spatially distinguish different virtual users 510 at different virtual locations 520.

FIG. 6A illustrates an example of a first room 240A participating in the conferencing session. FIG. 6A also illustrates the virtual locations 520 of virtual users 510 as perceived by users 410 listening to the representative audio stream in the room 240A. In this example, the representative audio stream associates each virtual user 510 with a client device 210 such that each client device 210 plays audio from the representative audio stream representing a single virtual user from other rooms 240. That is, the virtual locations 520 of the virtual users 510 are the location of the client devices 210 on the conference table 430A. For example, the representative audio stream associates virtual user 510E with client device 210A such that the virtual location 520E of the virtual user 510E is at the location of the client device 210A. As such, users 410 in the room 240A perceive virtual user 510E as being at the location of client device 210A. In one example, each first audio stream from a client device in a first group (e.g., first room) is used for generating a respective second audio stream for a client device in a second group (e.g., second room). In this sense, there may be a one-to-one correspondence between client devices in the first group and the second group. This may proceed in line with what has been described above in section III.D.

FIG. 6B illustrates an example of a second room 240B participating in the conferencing session. FIG. 6B also illustrates the virtual locations 520 of virtual users 510 as perceived by users 410 listening to the representative audio stream in the room 240B. In this example, the host (e.g., audio processing module 320) generates a representative audio stream (e.g., second audio streams for respective client devices) such that, in tandem, the loudspeakers of client devices 210 on conference table 430B allow users in room 240B to spatially distinguish different virtual users at different virtual locations. Contrary to the previous room, the virtual locations 520 are not necessarily the locations of the client devices 210 on conference table 430B. In an example, the spatially distinguishing virtual users can be accomplished by applying different panning gains between different loudspeakers on different client devices 210. Further, in an example, because of the separation between a speaker location (e.g., speaker location 420E) and a client device (e.g., client device 210E), the spatial perception of users in the room is distorted compared to standard listening conditions of stereophonic panning. However, because different gains may be applied to audio streams from different virtual users, the listeners will be perceived at different virtual locations. This may proceed in line with what will be described above in section VII.C.

VII. Configuring a Distributed Client Device Array

In some examples the host (e.g., audio processing module 320) may generate a representative audio stream (e.g., second audio streams for respective client devices), using a distributed array (e.g., group) of client devices in a room. The host may access the microphones and/or loudspeakers of the client devices in the array (e.g., group) to record an audio stream or play back a representative audio stream. The host may configure the client devices 210 in the array and/or the client device array itself such that the devices and array may spatially record and play back audio streams. For example, audio processing module 320 determines which client devices 210 are located in the same room and temporally synchronizes audio streams between client devices 210 in the same room 240. Further, audio processing module 320 may configure client devices 210 and/or the client device array for audio input, audio output, and spatial resolution as described herein.

To begin a conferencing session, a user may interact with an application 310 on a client device 210. The host device can send an invitation to join the conferencing session to different users operating client devices. Users 410 operating client devices 210 in various rooms 240 connect to a conferencing session via a network 230. For example, each user can join a conferencing session via a common URL provided in the invitation coming from the initiating client device, or may use some other method of joining the conferencing session. Each user connected to the conferencing session may be provided with specific identification tags as well as a time clock. After users have joined the conferencing session, the host (e.g., audio processing module 320) may identify groups of client devices (e.g., client device arrays) based on acoustic spaces (e.g., rooms) in which the client devices are located. For example, the host may identify client devices for a client device array that are in the same room. After identifying the client devices for the array, the host (e.g., audio processing module) may then configure the array and/or client devices for input, output, and spatial resolution as described herein.

VII.A Input

The host (e.g., audio processing module 320) can configure a distributed client device array (group of client devices) for recording (or capturing) audio streams from multiple users. For example, the audio processing module 320 can determine which client devices 210 are in the same room, the locations of users in a room, or any other audio properties (or, more generally, audio data) that can be used to generate accurate representative audio streams from recorded audio streams.

In one example, audio processing module 320 can determine which users are in which rooms (or acoustic spaces in general) using a graphical user interface displayed on client devices 210 participating in the listening session. That is, a user can interact with a client device 210 and assign client devices 210 connected to a conferencing session to different rooms 240. Based on the assignments, the audio processing module 320 may generate a representative audio stream (e.g., second audio streams for rendering by respective client devices) as previously described. In other words, the grouping of the plurality of client devices may be performed based on a user input that is indicative of a list of client devices in a given room (acoustic space). This user input may be generated using a GUI, as described below. Said grouping may then be taken into account when generating the second audio streams.

Figure 7:
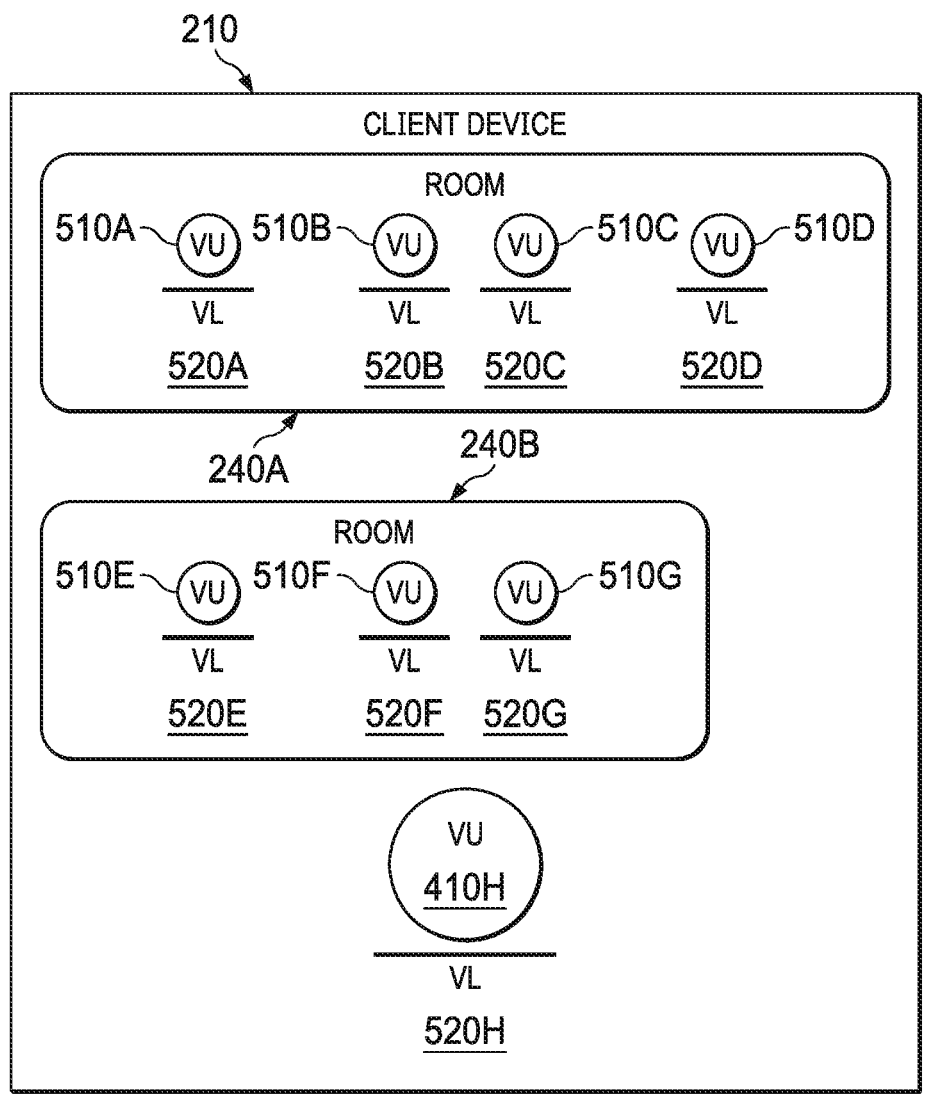
FIG. 7 is an illustration of an example user interface that can be used to group users into locations within the environment.

FIG. 7 shows an example GUI (e.g., user interface 330) presented to a user (e.g., 410A) of a client device 210. The GUI allows the user 410A to group other users (e.g., 410B-H) connected to a conferencing session. In. FIG. 7 each user 410 connected to the conferencing session may be displayed by avatars (or a user profile photo) on the client device 210. A user 410A interacting with the client device 210 may be depicted in another area of the display. A user 410A can then select (via touch input, etc.) which users 410B-H are in which rooms 240 (or acoustic spaces in general). In this illustration, users bounded by a line are in similar rooms 240, or any other grouping. Grouping data may then be shared with all client devices 210 in the conferencing session via the network 230. Various other graphical user interfaces may be used in a similar manner. Further, more than one user connected to a conferencing session may assign groups to other users.

In another example, the host (e.g., audio processing module 320) can automatically determine which users 410 are in the same room 240 during a conferencing session. This may be done by means of acoustic watermarking techniques. For example, when a user 410 joins a conferencing session, audio processing module 320 can send a measurement signal (e.g., a company audio logo, jingle, or any other predetermined audio signal) for playback on a client device 210 (e.g., the client device 210 that newly joins the conferencing session). If another client device 210 in the same room 240 is already connected to the conferencing session, its microphone will record the measurement signal. The host (e.g., audio processing module 320) may then detect (e.g., via pattern recognition) the measurement signal played back by the connected client device 210. The host may then group the client devices 210 in the same room 240, i.e., may group the client devices into the same group of client devices. Once grouped, the host can generate a representative audio stream (e.g., second audio streams for respective client devices) using that information. For example, the host may assign client devices 210 that it detects in the same room to the same group. Afterwards, the host may assign the group to a similar virtual location 520. In this manner, the users in the group appear to be in the same virtual location 520 when played back on a client device 210 in the conferencing session. On the contrary, if the measurement signal is not detected by any other client device 210, the host assigns that connecting client device 210 to its own group. By iterating this process for each client device 210 connecting to a conferencing session, the host can automatically build a map of users grouped by location (e.g., by the client devices' belonging to respective acoustic spaces).

In general, acoustic watermarking may involve playing a predetermined audio signal (e.g., a company audio logo or jingle) by a client device that participates in the teleconference and checking for the presence of a representation of the predetermined audio signal in captured (i.e., first) audio streams of other client devices participating in the teleconference. The client device playing the predetermined audio signal may be an audio device that newly joins the teleconference. Checking for the presence of the representation of the predetermined audio signal may involve pattern detection, such as determining correlation functions of the predetermined audio signal and respective captured (i.e., first) audio streams, for example. If the representation of the predetermined audio signal is found in a first audio stream from another client device, the client device and the other client device are determined to be present in the same acoustic space and they may be grouped into the same group of client devices. Otherwise, if no other client device captures a first audio stream including the representation of the predetermined audio signal, the client device is grouped into a new group of client devices.

Another example for determining whether client devices should be grouped into the same group of client devices is to employ proximity detection by means of Bluetooth communication. To this end, the host (e.g., audio processing module) may access Bluetooth IDs from the client devices and lists of Bluetooth IDs that the client devices observe to be within range of the Bluetooth connection. Client devices (as identified by their Bluetooth IDs) that perceive each other to be in range of the Bluetooth connection may be judged to be present in the same acoustic space and hence should be grouped into the same group of client devices.

Another example for determining whether client devices should be grouped into the same group of client devices is to employ visual inspection, for example using one or more video cameras. The one or more video cameras may comprise respective video cameras provided with one or more of the client devices, or one or more additional video camera looking into a room (acoustic space) in which at least some of the client devices are located.

The host (e.g., audio processing module 320) can also temporally synchronize all client devices 210 connected to a conferencing session, or at least all client devices in a given group of client devices. For example, the network system 220 can be used as time scheduler to synchronize time between each client device 210 in the distributed array of client devices 210. In this way, recorded audio streams received at the network system 220 from various client devices 210 can be synchronized. For example, a recorded audio stream can include local data such as a sampling rate and local time stamp. Audio processing module 320 can utilize the local data to generate a representative audio stream. Additionally, the audio processing module 320 may distribute local data (and global data) to client devices 210 such that the representative audio stream can be accurately played back.

Alternatively or additionally, the host can time-synchronize or time-align the second audio streams from the client devices by introducing appropriate delays into the second audio streams. This may be used, for example, to compensate for different transmission latencies between the host and the client devices and to ensure that client devices that are employed for joint rendering of the same second audio streams or that are employed for spatial rendering playback appropriate audio signals. Accordingly, the host may, for a given group of client devices, determine a transmission latency between each of the client devices in the given group of client devices and the host. Then, the host may add respective delays to the second audio streams for the client devices in the given group of client devices based on the determined transmission latencies, to time-synchronize the second audio streams for the client devices in the given group of client devices.

The host (e.g., audio processing module 320) can also align the gain levels of all microphones in a client device array. That is, the host can ensure that microphones in the client device array record a similar audio signals at the same level. In one example, one user may speak a calibration phrase in front of each client device 210 in an client device array and audio processing module 320 can normalize microphone gain for each client device 210 based on the recording. Other examples of normalization are possible as well, and a specific example for aligning the client devices' input gains is described further below.

VII.B Output

Audio processing module 320 can configure a distributed microphone array for playback of representative audio streams generated from audio streams recorded from multiple users. For example, the audio processing module 320 can determine which client devices 210 to play back representative audio streams based on the number of client devices 210 in a group (e.g., room), the number of representative audio streams to be played back, the input from users connected to a conferencing session, etc.

In one configuration, the host (e.g., audio processing module 320) can employ an audio stream matrixing scheme to determine audio playback. Broadly speaking, in a matrixing scheme, the host can assign any number of input recorded audio streams to outputs to play back on any number of client devices 210. For example, in a conferencing session, every recorded audio stream (first audio stream) is an input and every client device 210 capable of audio playback is an output (i.e., respective second audio streams are output to the client devices 210). That is, the host maps input audio streams to audio playback devices in using a matrixing scheme. Some matrixing examples include: a recorded audio stream from one user (e.g., 420A) played back on a single client device 210 (e.g., 210E) in another room, a recorded audio stream from one user played back on multiple client devices 210 in a another room, recorded audio streams from multiple users played back on a single client device 210 in another room, recorded audio streams from multiple users can be played back on multiple client devices 210 in another room, etc. Generally, inputs from one room are not connected to outputs in the same room as previously described.

In general, the host may determine a linear mapping function (e.g., a multi-linear mapping function) for mapping the first audio streams (or source audio streams generated from the first audio streams) to the second audio streams based on the grouping of the plurality of client devices into the two or more groups. Then the host may generate the second audio streams from the first audio streams by applying the linear mapping function to the first audio streams. The determined linear mapping function may be fixed as long as the composition of the members of the teleconference does not change. It may be determined anew whenever a client device joins or leaves the teleconference. If the first and second audio streams are assumed to be arranged as the entries of respective (column or row) vectors, the linear mapping function can be implemented as a matrix that acts on the (column) vector of the first audio streams. In some implementations, the matrix may be a square matrix.

In some such implementations, there may be a one-to-one relationship between client devices in their function as generators of first audio streams and client devices in their function as recipients of second audio streams. For instance, each first audio stream from client devices in a first group of client devices may be (exclusively) used to generate a respective second audio stream for a respective client device in a second group of client devices.

The host (e.g., audio processing module 320) can determine or define inputs and outputs for a matrixing scheme using a graphical user interface displayed on client devices 210 participating in a conferencing session. That is, a user can interact with a client device 210 and assign client devices 210 recording an audio stream in a conferencing session as inputs and map those audio streams for play back to client devices 210 connected to the conferencing session. Based on the assignments, the host may generate a representative audio stream such that the representative audio stream can be played back on the assigned client device 210 as previously described.

FIG. 8 is an example of a controller for a matrixing scheme that can be displayed on a client device 210 participating in a conferencing session. Here, the input audio streams are in the left column and the output client devices 210 for audio play back are in the top row. Each input is assigned an output as indicated by a highlighted square. While in this example, there is a one to one correspondence between inputs and outputs, any other correspondences are possible. For example, the input audio stream from client device 210A could also be an input for the output audio stream to client device 210F. As another example, the output audio stream on client device 210E could also include input from client device 210D.

Audio processing module 320 can automatically assign inputs to outputs in a matrixing scheme. For example, audio processing module 320 can randomly assign input recorded audio stream as output for play back on client devices 210 until all inputs are assigned to outputs. If there are more inputs than outputs, audio processing module 320 may assign more than one input to an output. In another example, audio processing module 320 can use ranked metadata to assign input recorded audio streams as output for play back on client devices 210. Ranked metadata can be a user-defined quality parameter or an objective quality parameter. For example, an input can be ranked on an importance order. For example, the leader of the conferencing session may have a highest importance order and, accordingly, audio processing module 320 assigns the leader's input to all output playback devices. Alternatively, if an input is, for example, an interviewer, the input may have a low importance order and, accordingly audio processing module 320 assigns the input to a single output. Thus, users in a room can hear a relative importance different between inputs.

The host (e.g., audio processing module 320) can also align the gain levels of all loudspeakers in a client device array (e.g., in a group of client devices). That is, the host can ensure that loudspeakers in the client device array play back a similar audio signal at the same level. This can be achieved by performing a pre-calibration step for aligning the input and/or output volumes. In one example, a user may place a microphone (e.g., a microphone in a client device 210) at equal distance from all other client devices 210 in the array. Each client device 210 then successively plays a similar acoustic signal that is recorded and analyzed by the central client device so as to estimate each output level. When all client devices 210 in the array have been measured, the host (e.g., audio processing module 320) may automatically align each output level. A similar process occurs for the client device 210 that was used as the centered recording client device 210. Likewise, the client devices could be places at equal distances from a single sound emitting source (e.g., a loudspeaker in a client device) and align each microphone input gain so that the measured volume is the same on each client device.

VII.C Spatial

The host (e.g., audio processing module 320) can configure a distributed client device array (e.g., group of client devices) for spatially rendered playback of representative audio streams. The distributed client device array can use any of the techniques described herein to generate and play back a representative audio stream. That is, the distributed client device array can play back a representative audio stream (e.g., second audio streams for respective client devices) such that users in a room perceive the audio streams generated by users in a different room at a distinct spatial location or locations. Herein, this process will be described as the host (e.g., audio processing module 320) spatially rendering inputs for output in a conferencing session.

In one example implementation thereof, the host may, for a given group of client devices, assign client devices in other groups of client devices to respective virtual source locations in a virtual listening environment. In this case, the second audio streams for the client devices in the given group of client devices may be generated such that captured audio from the client devices in the other groups of client devices is rendered to respective virtual source locations when the second audio streams for the client devices in the given group of client devices are rendered by the client devices in the given group of client devices. This may involve panning the first audio streams (or source audio streams generated therefrom) to the second audio streams in the given group of client devices. The panning may be based on a relative spatial arrangement of the client devices in the given group of client devices. The virtual source locations of the client devices in the other groups may, but do not have to be, based on relative spatial arrangements of the client devices in the other groups.

In one configuration, spatially rendering inputs includes panning techniques. Panning techniques diffuse an input signal over several outputs with weighting coefficients. The weighting coefficients are calculated upon geometric considerations of the virtual location 520 of a virtual user 510 with respect to real world position of the play back client devices 210. There are various geometry-based calculation of weights. For example, in vector based amplitude panning (VBAP), the weights are calculated so that the virtual location of the virtual audio source is the barycenter of the k (>=2) closest output client devices 210. An alternative is distance based amplitude panning which calculates the weights depending on the relative distance between the desired virtual position of the virtual audio source and each output client device's real-world position.

In one configuration, spatially rendering inputs includes beam-forming techniques. Beam-forming uses an array of client device 210 speakers (e.g., speakers of client devices in a group of client devices) to focus emitted sound towards a given direction (e.g., a virtual location). That is, a distributed array of client devices 210 controls the directivity of the emitting system. In one example, implementing beam forming may be accomplished by acoustically measuring the characteristics of the radiated sound field of each loudspeaker, via impulse response measurement. Subsequently, audio processing module 320 may to calculate digital filters allowing to create a desired radiation pattern for the speakers of the distributed array of client devices 210.

In one configuration, spatially rendering inputs includes wave field synthesis techniques. Using, wave field synthesis, audio processing module 320 synthesizes a wave front based on the desired virtual location of the virtual audio source. As a basic description, it consists of aligning the output client device 210 in gain and delay so that it recreates the wave front emitted from a virtual user at a virtual location. That is, the combination of loudspeakers generates a representative audio stream that creates a wave front which allows users to perceive a virtual user at a virtual location in the same room.

In one configuration, spatially rendering inputs can be based on input from a user on a graphical user interface. For example, a user may be able to assign the virtual locations of the virtual users. That is, a user may use his client device 210 to assign virtual locations such that the distributed array of client devices 210 recreates the audio stream from each indicated virtual user at their inputted virtual location.

In one configuration, spatially rendering inputs can be based on automatic detection of locations by client devices 210 in the array (e.g., group). As previously described, audio processing module 320 can determine the approximate position of users in rooms 240. As such, audio processing module 320 can automatically assign users virtual locations. Those users at virtual locations may act as an input to be output by client devices 210. Audio processing module can then generate representative audio streams that can be played back on client devices 210 that approximate the virtual locations. This allows a degree of fidelity when spatially rendering multiple users in different rooms.

In one configuration, spatially rendering inputs can be based on equal distribution of inputs. For example, in a conferencing session the host (e.g., audio processing module 320) may automatically assign virtual locations to each input such that the inputs are equally distributed over the entire span of the output client devices 210. If there are several groups of user inputs (e.g., users in different rooms 240), users located in the same group (e.g., room) may be spatially grouped together in specific spatial regions. For example, users in room 240A may playback users from room 240C on the left side and users from room B on the right side of the client device 210 array. Here, groups and individuals can be given different priority of position as previously described.

In one configuration, spatially rendering inputs can use smoothing techniques. A smoothing techniques smooths the output level across all client devices 210 in the array (e.g., group). For example, instead of playing loud outputs on a single client device 210 and soft outputs on another client devices 210, the outputs may be normalized to approximately the same volume.

VIII. Example Computing Device

Figure 9:
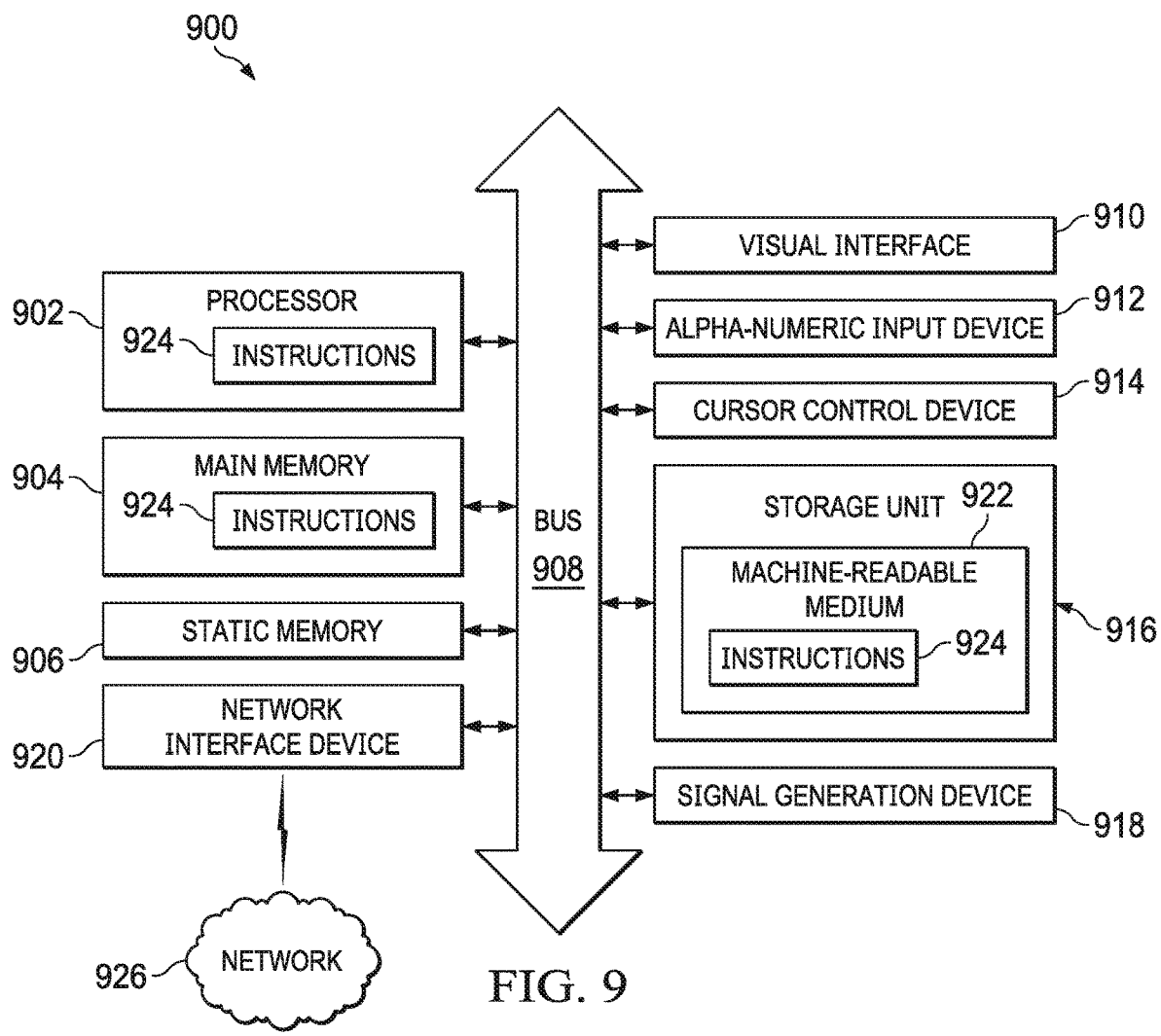
FIG. 9 is a block diagram illustrating components of an example machine able to read instructions from a machine-readable medium and execute them in a processor (or controller).

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 (e.g., corresponding to client device 210) within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen. The computer system 900 may also include alphanumeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

IX. Additional Configuration Considerations

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects and implementations of the present disclosure may be appreciated from the enumerated example embodiments (EEEs) listed below.

EEE 1. A method of hosting a teleconference among a plurality of client devices arranged in two or more acoustic spaces, each client device having an audio capturing capability and/or an audio rendering capability, the method comprising:
grouping the plurality of client devices into two or more groups based on their belonging to respective acoustic spaces;
receiving first audio streams from the plurality of client devices;
generating second audio streams from the first audio streams for rendering by respective client devices among the plurality of client devices, based on the grouping of the plurality of client devices into the two or more groups; and
outputting the generated second audio streams to respective client devices.

EEE 2. The method according to EEE 1, wherein generating the second audio streams comprises:
for an active sound source in a given acoustic space, determining the client device in the given acoustic space that is closest to the active sound source;
generating a source audio stream that represents captured audio for the currently active sound source based on the first audio stream from the determined client device, disregarding the first audio streams from any other client devices in the same group as the determined client device; and
generating the second audio streams from the source audio stream.

EEE 3. The method according to EEE 2, wherein determining the client device in the given acoustic space that is closest to the active sound source is based on at least one of:
measuring sound volumes of audio events in first audio streams from client devices in a group corresponding to the given audio space; and
measuring times of arrival of audio events in first audio streams from client devices in a group corresponding to the given audio space.

EEE 4. The method according to EEE 1, wherein generating the second audio streams comprises:
for an active sound source in a given acoustic space, applying a signal processing technique to the first audio streams from client devices that are grouped in a group corresponding to the given acoustic space, to generate a source audio stream that represents captured audio for the currently active sound source; and
generating the second audio streams from the source audio stream.

EEE 5. The method according to any one of the preceding EEEs, wherein for a given group of client devices, first audio streams from client devices in the given group of client devices are not used for generating second audio streams for the client devices in the given group of client devices.

EEE 6. The method according to any one of the preceding EEEs, wherein the second audio streams are generated to be the same for all client devices in a given group of client devices.

EEE 7. The method according to any one of the preceding EEEs, further comprising: determining a linear mapping function for mapping the first audio streams to the second audio streams based on the grouping of the plurality of client devices into the two or more groups; and generating the second audio streams from the first audio streams by applying the linear mapping function to the first audio streams.

EEE 8. The method according to any one of the preceding EEEs, further comprising: for at least one group of client devices, assigning client devices in other groups of client devices to respective virtual source locations in a virtual listening environment, wherein the second audio streams for the client devices in the at least one group of client devices are generated such that captured audio from the client devices in the other groups of client devices is rendered to respective virtual source locations when the second audio streams for the client devices in the at least one group of client devices are rendered by the client devices in the at least one group of client devices.

EEE 9. The method according to any one of the preceding EEEs, further comprising:
for each client device among the plurality of client devices, detecting whether the respective client device renders audio via headphone loudspeakers; and
for each client device that is determined to render audio via headphone loudspeakers, generating the second audio stream for the respective client device to include captured audio from all active sound sources.

EEE 10. The method according to any one of the preceding EEEs, further comprising at least one of:
performing single-channel echo cancellation for at least one client device among the plurality of client devices to suppress a representation of the second audio stream received by the at least one client device in the first audio stream output by the at least one client device; and
performing multi-channel echo cancellation for at least one group of client devices to suppress representations of the second audio streams received by the client devices in the at least one group of client devices in the first audio streams output by the client devices in the at least one group of client devices.

EEE 11. The method according to any one of the preceding EEEs, wherein grouping the plurality of client devices based on their belonging to respective acoustic spaces involves at least one of:
acoustic watermarking;
receiving a user input indicative of a list of client devices present in at least one acoustic space; proximity detection using Bluetooth communication between client devices; and visual inspection using one or more video cameras.

EEE 12. The method according to any one of the preceding EEEs, further comprising:
for at least one group of client devices, determining a relative spatial arrangement of the client devices in the respective group of client devices,
wherein generating the second audio streams is further based on the determined relative spatial arrangement of client devices in the at least one group of client devices.

EEE 13. The method according to any one of the preceding EEEs, further comprising:
for at least one group of client devices, determining a transmission latency between each of the client devices in the at least one group of client devices and a device hosting the teleconference; and
adding respective delays to the second audio streams for the client devices in the at least one group of client devices based on the determined transmission latencies, to time-synchronize the second audio streams for the client devices in the at least one group of client devices.

EEE 14. The method according to any one of the preceding EEEs, wherein the grouping the plurality of client devices into two or more groups is further based on at least one of:
operating systems of the client devices; and
CPU availabilities of the client devices.

EEE 15. A computation device comprising a processor configured to perform the method according to any one of the preceding EEEs.

EEE 16. A computer program including instruction that, when executed by a computation device, cause the computation device to perform the method according to any one of EEEs 1 to 14.

EEE 17. A computer-readable storage medium storing the computer program according to the preceding EEE.

The invention claimed is:

1. A method of hosting a teleconference among a plurality of client devices arranged in two or more acoustic spaces, each client device having an audio capturing capability and/or an audio rendering capability, the method comprising:
grouping the plurality of client devices into two or more groups based on their belonging to respective acoustic spaces, wherein the two or more groups include a first group into which two or more client devices in the plurality of client devices are grouped, wherein the two or more client devices belong to a first acoustic space in the two or more acoustic spaces;
receiving, by a computation device over one or more networks, first audio streams from the plurality of client devices;
for each client device among the plurality of client devices:
detecting whether the respective client device renders audio via headphone loudspeakers, and for each client device that is determined to render audio via headphone loudspeakers, assigning two or more active talkers to at least one virtual source location in a virtual listening environment to be rendered on the client device;
generating, by the computation device from the first audio streams, second audio streams for rendering by respective client devices among the plurality of client devices, wherein the second audio streams are generated based on the assigning of the two or more active talkers to the at least one virtual location; and
outputting, by the computation device over the one or more networks, the generated second audio streams to the respective client devices for rendering.

2. The method according to claim 1, wherein generating the second audio streams comprises:
for an active talker in a given acoustic space, determining the client device in the given acoustic space that is closest to the active talker;
generating a source audio stream that represents captured audio for the currently active talker based on the first audio stream from the determined client device, disregarding the first audio streams from any other client devices in the same group as the determined client device; and
generating the second audio streams from the source audio stream.

3. The method according to claim 2, wherein determining the client device in the given acoustic space that is closest to the active talker is based on at least one of:
measuring sound volumes of audio events in first audio streams from client devices in a group corresponding to the given audio space; and
measuring times of arrival of audio events in first audio streams from client devices in a group corresponding to the given audio space.

4. The method according to claim 1, wherein generating the second audio streams comprises:
for an active talker in a given acoustic space, applying a signal processing technique to the first audio streams from client devices that are grouped in a group corresponding to the given acoustic space, to generate a source audio stream that represents captured audio for the currently active talker; and
generating the second audio streams from the source audio stream.

5. The method according to claim 1, wherein for a given group of client devices, first audio streams from client devices in the given group of client devices are not used for generating second audio streams for the client devices in the given group of client devices.

6. The method according to claim 1, wherein the second audio streams are generated to be the same for all client devices in a given group of client devices.

7. The method according to claim 1, further comprising:
determining a linear mapping function for mapping the first audio streams to the second audio streams based on the grouping of the plurality of client devices into the two or more groups; and
generating the second audio streams from the first audio streams by applying the linear mapping function to the first audio streams.

8. The method according to claim 1, further comprising at least one of:
performing single-channel echo cancellation for at least one client device among the plurality of client devices to suppress a representation of the second audio stream received by the at least one client device in the first audio stream output by the at least one client device; and
performing multi-channel echo cancellation for at least one group of client devices to suppress representations of the second audio streams received by the client devices in the at least one group of client devices in the first audio streams output by the client devices in the at least one group of client devices.

9. The method according to claim 1, wherein grouping the plurality of client devices based on their belonging to respective acoustic spaces involves at least one of:
acoustic watermarking;
receiving a user input indicative of a list of client devices present in at least one acoustic space;
proximity detection using Bluetooth communication between client devices; and
visual inspection using one or more video cameras.

10. The method according to claim 1, further comprising:
for at least one group of client devices, determining a relative spatial arrangement of the client devices in the respective group of client devices,
wherein generating the second audio streams is further based on the determined relative spatial arrangement of client devices in the at least one group of client devices.

11. The method according to claim 1, further comprising:
for at least one group of client devices, determining a transmission latency between each of the client devices in the at least one group of client devices and a device hosting the teleconference; and
adding respective delays to the second audio streams for the client devices in the at least one group of client devices based on the determined transmission latencies, to time-synchronize the second audio streams for the client devices in the at least one group of client devices.

12. The method according to claim 1, wherein the grouping the plurality of client devices into two or more groups is further based on at least one of:
operating systems of the client devices; and
CPU availabilities of the client devices.

13. A computation device comprising:
a computer processor; and
a non-transitory computer-readable storage medium storing a computer program that, when executed by the computer processor, causes the computer processor to perform operations of hosting a teleconference among a plurality of client devices arranged in two or more acoustic spaces, each client device having an audio capturing capability and/or an audio rendering capability, the operations comprising:
grouping the plurality of client devices into two or more groups based on their belonging to respective acoustic spaces, wherein the two or more groups include a first group into which two or more client devices in the plurality of client devices are grouped, wherein the two or more client devices belong to a first acoustic space in the two or more acoustic spaces;
receiving, by the computation device, first audio streams from the plurality of client devices;
for each client device among the plurality of client devices:
detecting whether the respective client device renders audio via headphone loudspeakers, and for each client device that is determined to render audio via headphone loudspeakers, assigning two or more active talkers sound sources to at least one virtual source location in a virtual listening environment to be rendered on the client device;
generating, by the computation device from the first audio streams, second audio streams for rendering by respective client devices among the plurality of client devices, wherein the second audio streams are generated based on the assigning of the two or more active talkers to the at least one virtual source location; and
outputting, by the computation device, the generated second audio streams to the respective client devices for rendering.

14. A non-transitory computer-readable storage medium storing a computer program that, when executed by a computer processor, causes the computer processor to perform operations of hosting a teleconference among a plurality of client devices arranged in two or more acoustic spaces, each client device having an audio capturing capability and/or an audio rendering capability, the operations comprising:
grouping the plurality of client devices into two or more groups based on their belonging to respective acoustic spaces, wherein the two or more groups include a first group into which two or more client devices in the plurality of client devices are grouped, wherein the two or more client devices belong to a first acoustic space in the two or more acoustic spaces;
receiving, by a computation device, first audio streams from the plurality of client devices;
for each client device among the plurality of client devices:
detecting whether the respective client device renders audio via headphone loudspeakers, and for each client device that is determined to render audio via headphone loudspeakers, assigning two or more active talkers to at least one virtual source location in a virtual listening environment to be rendered on the client device;
generating, by the computation device from the first audio streams, second audio streams for rendering by respective client devices among the plurality of client devices, wherein the second audio streams are generated based on the assigning of the two or more active talkers to the at least one virtual source location; and
outputting, by the computation device, the generated second audio streams to the respective client devices for rendering.

* * * * *

UNITED STATES PATENT AND TRADEMARK OFFICE
CERTIFICATE OF CORRECTION

| | |
|---|---|
| PATENT NO. | : 11,539,844 B2 |
| APPLICATION NO. | : 16/574792 |
| DATED | : December 27, 2022 |
| INVENTOR(S) | : Nguyen et al. |

It is certified that error appears in the above-identified patent and that said Letters Patent is hereby corrected as shown below:

In the Claims

Column 34, Line 5, Claim 13: where "or more active talkers sound sources to at least one" should read --or more active talkers to at least one--.

Signed and Sealed this
Sixteenth Day of May, 2023

Katherine Kelly Vidal
*Director of the United States Patent and Trademark Office*